(12) United States Patent
Cuttino et al.

(10) Patent No.: US 7,896,361 B2
(45) Date of Patent: Mar. 1, 2011

(54) PASSIVE VEHICLE SUSPENSION SYSTEM PROVIDING OPTIMAL CAMBER GAIN

(75) Inventors: James Franklin Cuttino, Huntersville, NC (US); John Stewart Shepherd, Waterloo, SC (US)

(73) Assignee: University of North Carolina at Charlotte, Charlotte, NC (US)

( * ) Notice: Subject to any disclaimer, the term of this patent is extended or adjusted under 35 U.S.C. 154(b) by 301 days.

(21) Appl. No.: 11/875,128

(22) Filed: Oct. 19, 2007

(65) Prior Publication Data

US 2008/0093815 A1 Apr. 24, 2008

Related U.S. Application Data

(60) Provisional application No. 60/853,791, filed on Oct. 23, 2006.

(51) Int. Cl.
*B60G 3/26* (2006.01)
(52) U.S. Cl. .................................. 280/5.521
(58) Field of Classification Search .............. 280/5.521, 280/86.751, 124.15, 124.135, 124.137, 124.138, 280/124.152
See application file for complete search history.

(56) References Cited

U.S. PATENT DOCUMENTS

| | | | | |
|---|---|---|---|---|
| 3,118,687 A * | 1/1964 | Forbush | ............... | 280/124.136 |
| 3,137,513 A * | 6/1964 | Marot | ................. | 280/124.103 |
| 4,546,997 A * | 10/1985 | Smyers | .................... | 280/5.509 |
| 4,573,702 A * | 3/1986 | Klem | ....................... | 280/5.504 |
| 4,657,271 A * | 4/1987 | Salmon | ............... | 280/124.139 |
| 6,267,387 B1 * | 7/2001 | Weiss | ........................ | 280/5.52 |
| 6,406,036 B1 * | 6/2002 | Laurent et al. | ........... | 280/5.509 |
| 6,547,260 B2 * | 4/2003 | Laurent et al. | ........... | 280/5.509 |
| 6,722,676 B2 * | 4/2004 | Zadok | ................. | 280/124.106 |
| 2006/0027990 A1 * | 2/2006 | Dobson et al. | ........ | 280/124.106 |

* cited by examiner

*Primary Examiner*—Paul N Dickson
*Assistant Examiner*—Robert A Coker
(74) *Attorney, Agent, or Firm*—Clements Bernard PLLC; Christopher L. Bernard

(57) ABSTRACT

The present invention provides a passive vehicle suspension system providing optimal camber gain and avoiding the "bump camber" problem. This vehicle suspension system utilizes a conventional sway bar and a kinematic system to rotate the tire(s) of a vehicle in a direction opposite the roll of the vehicle during turning or cornering, for example. The kinematic design allows for adjustability and optimization, providing optimal camber gain. Although an automotive vehicle suspension system is illustrated and described, and, specifically, a racing or everyday automotive vehicle suspension system, the concepts of the present invention are capable of much broader applicability.

21 Claims, 23 Drawing Sheets

PASSIVE VEHICLE SUSPENSION SYSTEM PROVIDING OPTIMAL CAMBER GAIN

CROSS-REFERENCE TO RELATED APPLICATION(S)

The present non-provisional patent application claims the benefit of priority of U.S. Provisional Patent Application No. 60/853,791 (James Franklin CUTTINO et al.), filed on Oct. 23, 2006, and entitled "PASSIVE SUSPENSION DESIGN FOR OPTIMAL CAMBER," the contents of which are incorporated in full by reference herein.

FIELD OF THE INVENTION

The present invention relates generally to vehicle suspension systems and the like. More specifically, the present invention relates to a passive vehicle suspension system providing optimal camber gain.

BACKGROUND OF THE INVENTION

Vehicle suspension systems and the like are designed to enhance the performance of modern vehicles, while maintaining a comfortable ride for passengers. Obviously, this performance-enhancement aspect is most important in racing applications, for example, while this comfort-maintenance aspect is most important in everyday applications, for example. These vehicle suspension systems constrain the position and orientation of a tire relative to a road surface. The maximum force that the tire can generate in a desired direction of travel is greatly influenced by the camber of the tire. Camber is the lean angle of the tire relative to the road surface, with the tire being perpendicular to the road surface under zero camber conditions. In general, the tire can generate the most straight-line acceleration and braking force under zero camber conditions, but can generate the most turning or cornering force with some amount of camber gain—the tire essentially "leaning into" the turn or corner. By maintaining zero camber conditions while traveling straight and leaning the tire into turns or corners, tire grip can be maximized and tire wear can be minimized.

Nearly all of the vehicle suspension systems currently available and used provide misapplied, insufficient, or no camber gain while turning or cornering. As a result, the tire rolls relative to the road surface—in the same direction that the vehicle rolls. This provides non-optimal camber for optimal tire grip. In addition, the majority of vehicle suspension systems currently available and used experience "bump camber." Bump camber is a condition wherein the camber gain provided to compensate for vehicle roll, when provided, also results in the tire cambering during purely vertical motion of the vehicle, such as when the vehicle goes over a bump. Previous attempts to address these camber gain "issues" have typically involved the use of active devices, adding energy to the vehicle suspension systems via actuators and the like. Such vehicle suspensions systems are inherently complex and expensive.

Thus, what is needed in the art is a vehicle suspension system that passively provides optimal camber gain when a vehicle turns or corners—this camber gain being opposite in direction to the vehicle roll. What is also needed in the art is a vehicle suspension system that avoids the related bump camber problem. Ideally, this passive vehicle suspension system providing optimal camber gain and avoiding the bump camber problem would be relatively simple and inexpensive, making it suitable for both racing and everyday applications.

BRIEF SUMMARY OF THE INVENTION

In various exemplary embodiments, the present invention provides a passive vehicle suspension system providing optimal camber gain and avoiding the bump camber problem. This vehicle suspension system utilizes a conventional sway bar and a kinematic system to rotate the tire(s) of a vehicle in a direction opposite the roll of the vehicle during turning or cornering, for example. The kinematic design allows for adjustability and optimization, providing optimal camber gain. It should be noted that, although an automotive vehicle suspension system is illustrated and described herein, and, specifically, a racing or everyday automotive vehicle suspension system, the concepts of the present invention are capable of much broader applicability.

In one exemplary embodiment, the present invention provides a passive vehicle suspension system, including: a first kinematic system associated with a first tire of a vehicle, wherein the first kinematic system is configured to adjust the camber of the first tire relative to a road surface in response to forces experienced by the vehicle; and wherein the passive vehicle suspension system operates without adding energy to the first kinematic system through an actuator. The passive vehicle suspension system also includes a second kinematic system associated with a second tire of the vehicle, wherein the second kinematic system is configured to adjust the camber of the second tire relative to the road surface in response to forces experienced by the vehicle. Typically, the first kinematic system is coupled to the second kinematic system. The first and second kinematic systems are configured to camber the first and second tires relative to the road surface into a turn or corner encountered by the vehicle, substantially opposite the direction of chassis roll. Typically, the camber of the first and second tires relative to the road surface is substantially equal. The first and second kinematic systems are also configured to maintain a substantially-parallel relationship between the first tire and the second tire during chassis heave.

In another exemplary embodiment, the present invention provides a passive vehicle suspension system, including: a first upright member coupled to a first tire of a vehicle, wherein the first upright member cambers with the first tire relative to a road surface; a first lower control arm pivotably coupled to a chassis of the vehicle and the first upright member; a first bell crank pivotably coupled to the first upright member and the first lower control arm; and wherein rotation of the first bell crank causes the first upright member and the first tire to camber relative to the road surface. The passive vehicle suspension system also includes a first connector link pivotably coupled between the first bell crank and the first upright member. The passive vehicle suspension system further includes a second upright member coupled to a second tire of the vehicle, wherein the second upright member cambers with the second tire relative to the road surface; a second lower control arm pivotably coupled to the chassis of the vehicle and the second upright member; a second bell crank pivotably coupled to the second upright member and the second lower control arm; and wherein rotation of the second bell crank causes the second upright member and the second tire to camber relative to the road surface. The passive vehicle suspension system still further includes a second connector link pivotably coupled between the second bell crank and the second upright member. The passive vehicle suspension system still further includes a substantially-rigid sway bar rotatably coupled to the first and second bell cranks, wherein the substantially-rigid sway bar is rotatably coupled to the chassis of the vehicle. The passive vehicle suspension system still further includes a sway bar connector coupled between the substantially-rigid sway bar and each of the first and second bell cranks. Finally, the passive vehicle suspension system includes an equal-camber bar rotatably coupled to the first and second upright members.

In a further exemplary embodiment, the present invention provides a passive vehicle suspension system, including: a first kinematic system associated with a first tire of a vehicle, wherein the first kinematic system is configured to adjust the camber of the first tire relative to a road surface in response to forces experienced by the vehicle; a second kinematic system associated with a second tire of the vehicle, wherein the second kinematic system is configured to adjust the camber of the second tire relative to the road surface in response to forces experienced by the vehicle; and wherein the passive vehicle suspension system operates without adding energy to the first kinematic system through an actuator. Typically, the first kinematic system is coupled to the second kinematic system. The first and second kinematic systems are configured to camber the first and second tires relative to the road surface into a turn or corner encountered by the vehicle, substantially opposite the direction of chassis roll. Typically, the camber of the first and second tires relative to the road surface is substantially equal. The first and second kinematic systems are configured to maintain a substantially-parallel relationship between the first tire and the second tire during chassis heave. The first kinematic system includes: a first upright member coupled to the first tire of the vehicle, wherein the first upright member cambers with the first tire relative to the road surface; a first lower control arm pivotably coupled to a chassis of the vehicle and the first upright member; a first bell crank pivotably coupled to the first upright member and the first lower control arm; and wherein rotation of the first bell crank causes the first upright member and the first tire to camber relative to the road surface. The first kinematic system also includes a first connector link pivotably coupled between the first bell crank and the first upright member. The second kinematic system includes: a second upright member coupled to the second tire of the vehicle, wherein the second upright member cambers with the second tire relative to the road surface; a second lower control arm pivotably coupled to the chassis of the vehicle and the second upright member; a second bell crank pivotably coupled to the second upright member and the second lower control arm; and wherein rotation of the second bell crank causes the second upright member and the second tire to camber relative to the road surface. The second kinematic system also includes a second connector link pivotably coupled between the second bell crank and the second upright member. The passive vehicle suspension system also includes a substantially-rigid sway bar rotatably coupled to the first and second bell cranks, wherein the substantially-rigid sway bar is rotatably coupled to the chassis of the vehicle. The passive vehicle suspension system further includes a sway bar connector coupled between the substantially-rigid sway bar and each of the first and second bell cranks. Finally, the passive vehicle suspension system includes as equal-camber bar rotatably coupled to the first and second upright members.

In a still further exemplary embodiment, the present invention provides a passive vehicle suspension system, including: a left housing and a right housing, wherein each of the left and right housings includes a shock paddle configured to pivotably engage a shock or the like that is directly or indirectly coupled to a chassis of a vehicle; a torsional splitter bar disposed substantially concentrically within the left and right housings, wherein the torsional splitter bar includes a torsional splitter bar paddle on each end, wherein each of the torsional splitter bar paddles is coupled to and selectively biases a first linkage via a first elongate member; an equal camber bar disposed substantially concentrically within the left and right housings, wherein the equal camber bar includes an equal camber bar paddle on each end, wherein each of the equal camber bar paddles is coupled to and selectively biases the first linkage via a second elongate member; and a pivotable axle assembly coupled to the first linkage via a second linkage. Optionally, the torsional splitter bar is disposed substantially concentrically within the equal camber bar. Preferably, the equal camber bar paddles are disposed on opposite top and bottom surfaces of the equal camber bar.

BRIEF DESCRIPTION OF THE DRAWINGS

The present invention is illustrated and described herein with reference to the various drawings, in which like reference numbers are used to denote like system components and/or method steps, as appropriate, and in which.

DETAILED DESCRIPTION OF THE INVENTION

The vehicle suspension system of the present invention is designed and configured to optimize tire contact with the road surface. This vehicle suspension system constrains the tires (left and right, whether front or back) to be flat on the road surface when traveling straight or braking, and leans the tires into a turn or corner during lateral acceleration, for example, without the use of active devices. In addition, the left and right suspensions can displace independently. The vehicle suspension system is compared to conventional double A-arm suspensions, McPherson strut suspensions, and the like, as appropriate. A specific conceptual design is presented herein. This specific conceptual design is one possible conceptual design and illustrates how some of the various packaging issues can be resolved. It will be readily apparent to those of ordinary skill in the art, however, that other conceptual designs can be utilized.

Figure 1:
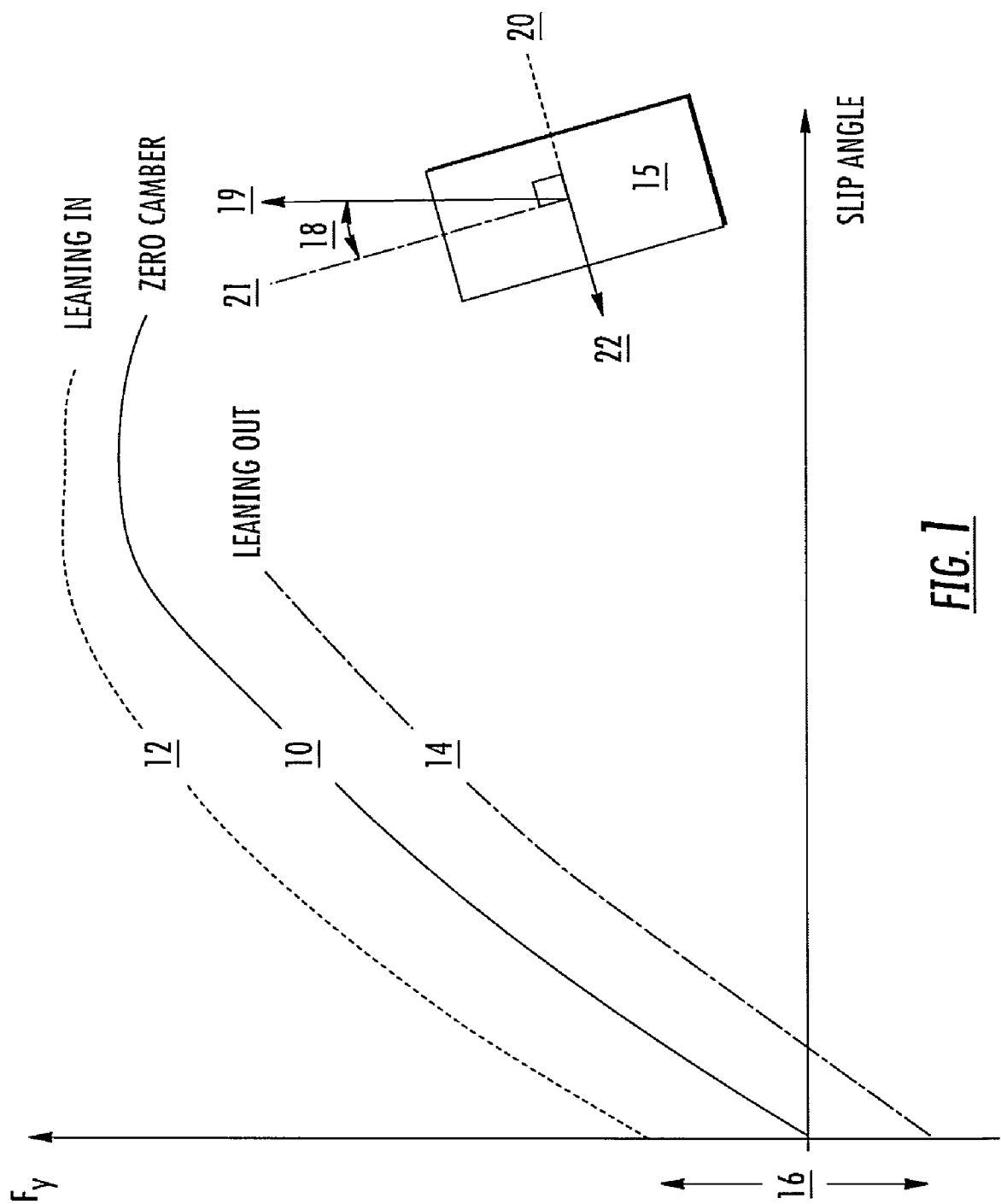
FIG. 1 is a graph illustrating lateral force as a function of slip angle for various tire cambers, including zero camber, a tire leaning into a turn or corner, and a tire leaning out of a turn or corner, as well as the occurrence of camber thrust.

In general, high-performance vehicle suspension systems are designed and configured to maximize tire forces in order to obtain the most acceleration in a desired direction of travel, for example. These vehicle suspension systems must, however, be designed and configured to accommodate a given tire's performance characteristics. Most pneumatic tires have similar performance characteristics, such as the effect that camber has on maximum lateral force. For example, if the tire is leaning into a turn or corner, it will generate more lateral force than if the tire is leaning out of the turn or corner. This is illustrated in FIG. 1, a top-down view, which shows zero camber 10, the tire leaning into the turn or corner 12, and the tire leaning out of the turn of corner 14 as a function of slip angle and lateral force. Tire camber will often generate a lateral force even if the tire is steered in a forward direction of travel with zero slip angle, an effect which is referred to as "camber thrust" 16. It should be noted that the slip angle 18 is the angle between the direction of travel 19 of the tire 15, about the axis of rotation 20, and the forward tire vector 21. The lateral force 22 lies along the axis of rotation 20 of the tire 15.

Figure 2:
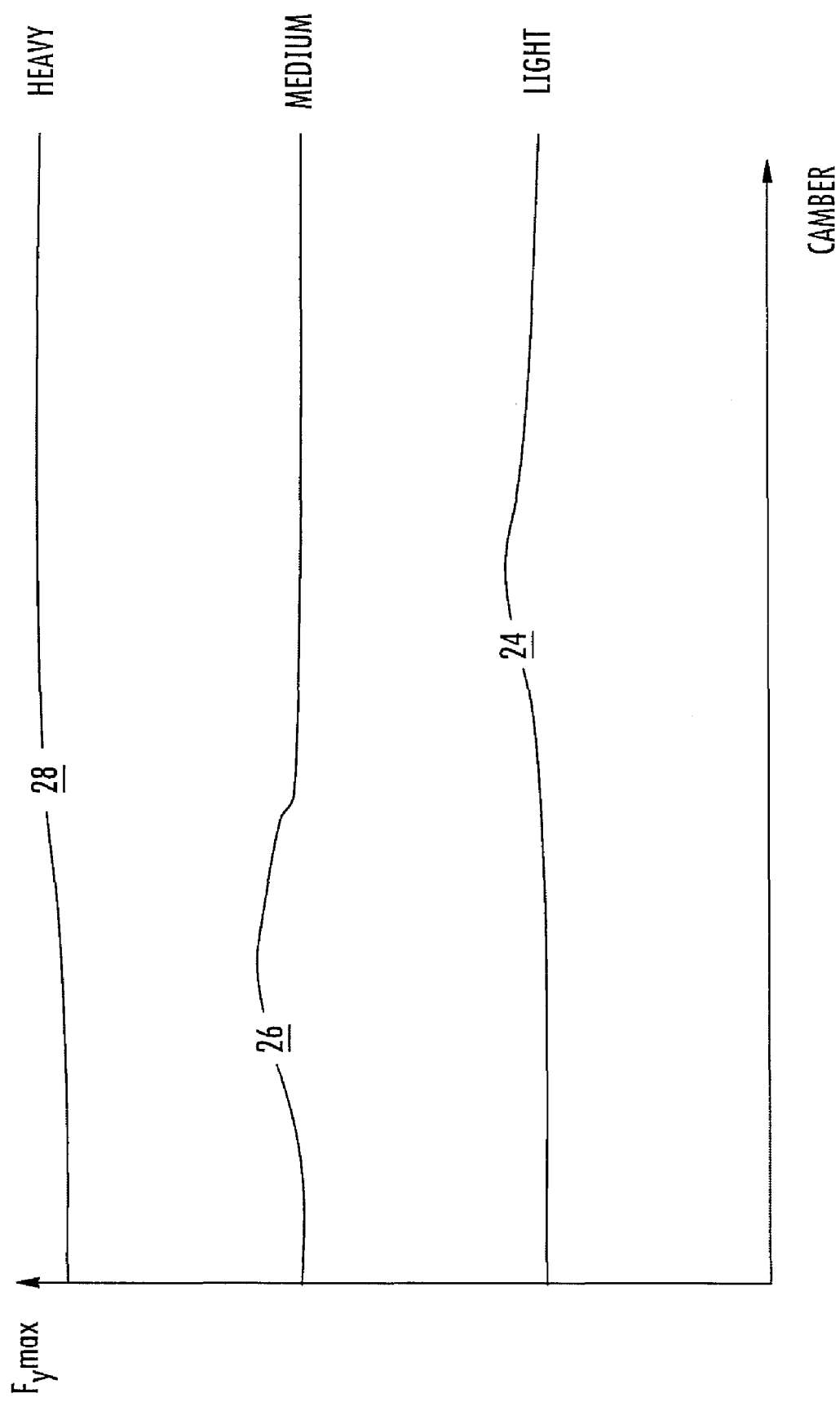
FIG. 2 is a graph illustrating maximum lateral force, $F_y$max, as a function of camber in the direction of a turn or corner, highlighting the maximum lateral force peak for a light-weight vehicle, a medium-weight vehicle, and a heavy-weight vehicle, respectively.

The amount of camber gain, in the direction of a turn or corner, required to maximize the tire's lateral force depends upon many factors, such as the given tire's performance characteristics and the normal load on the tire. The addition of camber, leaning the tire into the turn or corner, typically will not increase the heat generated by the tire, but will improve the tire's performance. Overheating a tire can cause increased tire wear and degraded tire performance. Thus, the addition of too much or too little camber can result in less than optimal lateral force. This is illustrated in FIG. 2, which shows maximum lateral force as a function of camber in the direction of a turn or corner, highlighting the maximum lateral force peak for a light-weight vehicle 24, a medium-weight vehicle 26, and a heavy-weight vehicle 28, respectively.

Figure 3:
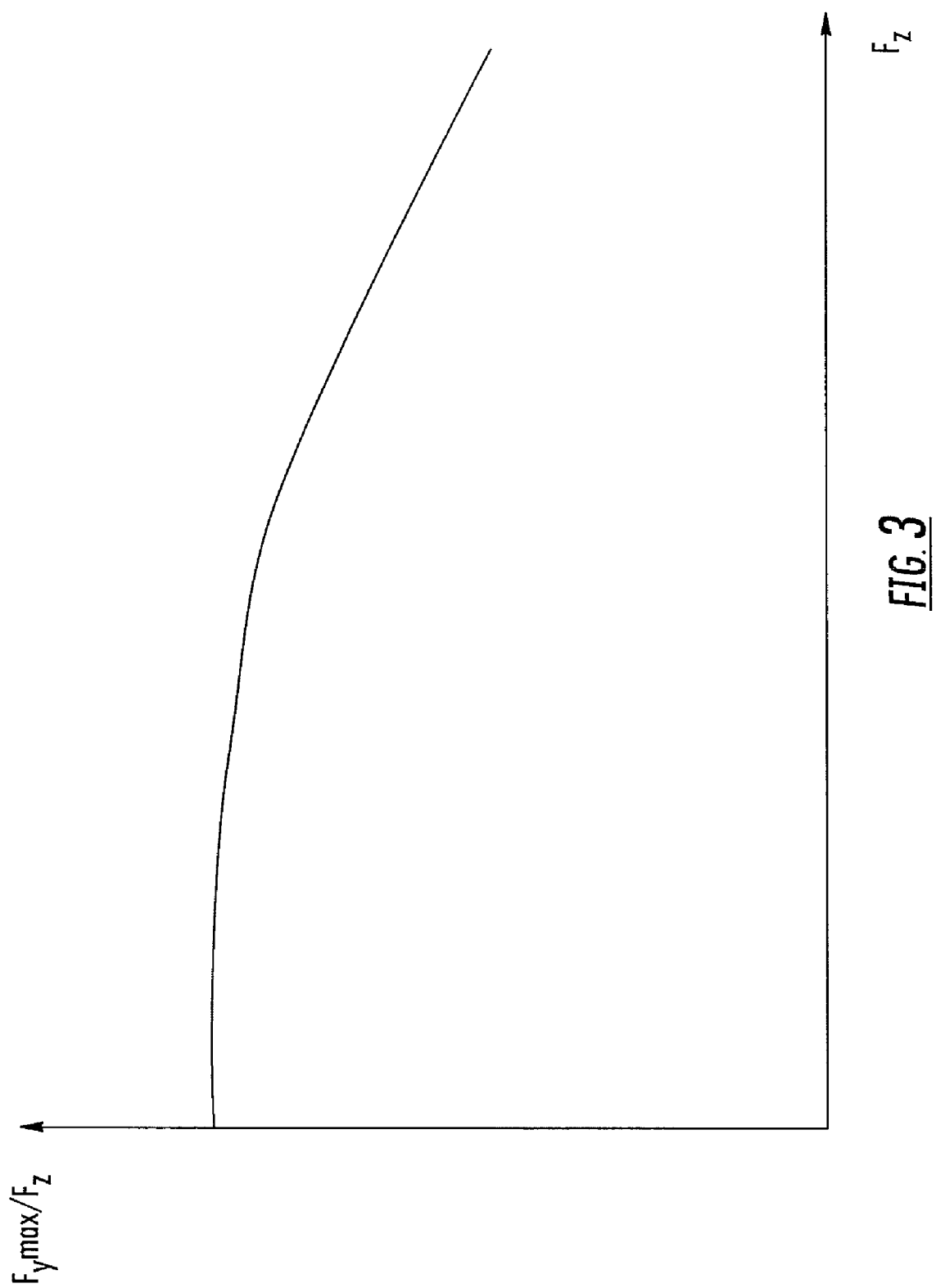
FIG. 3 is a graph illustrating the ratio of tire lateral force to tire normal load as a function of tire normal load.

Maximum tire longitudinal force, required during acceleration or braking, is typically produced with nominally zero tire camber. The maximum tire longitudinal force is a function of many parameters, including, but not limited to, tire normal load, $F_z$, tire temperature, and road conditions. As the normal load increases, the maximum lateral and longitudinal forces also increase. However, the ratio between maximum lateral force and normal load ($F_y/F_z$), often considered the coefficient of friction of the tire, is not constant, as the normal load varies and almost always has a negative slope. This is illustrated in FIG. 3.

Therefore, as the mass of the vehicle decreases, the maximum lateral or longitudinal acceleration of the vehicle typically increases while using the same set of tires. This same trend can be seen for tires used off-road, on dirt or gravel surfaces. In the case of an unsmooth level road surface, the normal force is changing but the mass of the vehicle remains the same. If the normal force can be kept more constant, maximum lateral or longitudinal forces can be achieved on average. A more constant normal force over unsmooth level road surfaces can be achieved by utilizing a relatively light-weight unsprung suspension mass (i.e. wheels, tires, etc.) relative to the relatively heavy-weight sprung mass of the vehicle (i.e. chassis, etc.) and utilizing relatively low spring stiffness, assuming the suspension does not reach its travel limits.

Figure 4:
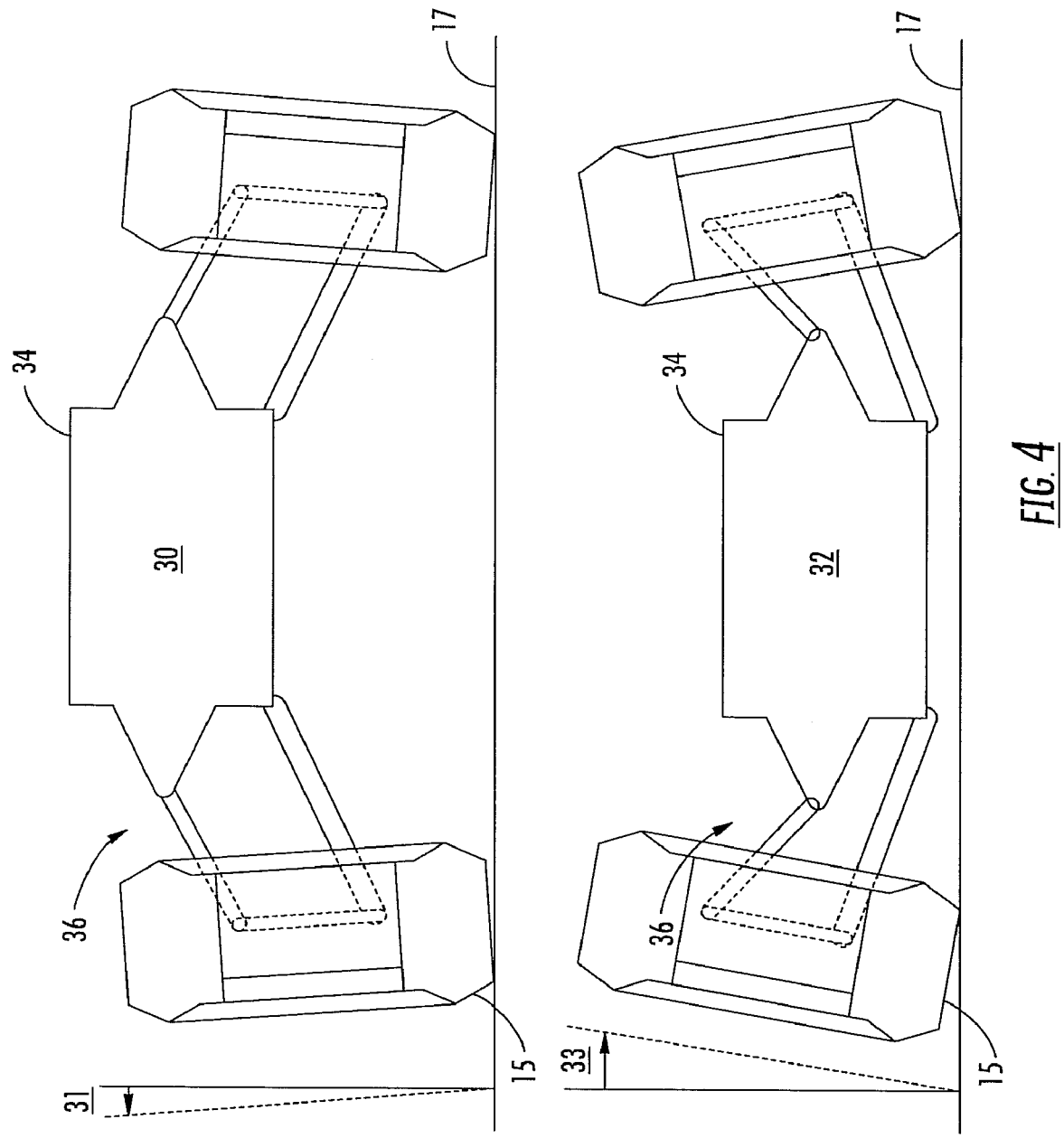
FIG. 4 is a schematic diagram illustrating both positive and negative camber caused by the vertical displacement of the body of a vehicle (a double A-arm suspension being illustrated)

Referring to FIG. 4, camber is defined as the angle 31,33 between the tire 15 and the road surface 17. Zero camber means that the tire 15 is perpendicular to the road surface 17. A positive camber scenario 30 exists when the tops of the tires 15 are leaning outwards and away from the vehicle. A negative camber scenario 32 exists when the tops of the tires 15 are leaning inwards and towards the vehicle. The camber illustrated is, in this case, caused by vertical displacement of the of the body 34 of the vehicle (a double A-arm suspension 36 being illustrated). Some negative camber is usually utilized by performance vehicles for increased lateral force potential.

Double A-arm suspensions, McPherson strut suspensions, and live-axle with leaf spring suspensions are very commonly used suspensions for vehicles, the last being very commonly used in truck rear ends. DeDion suspensions, swing arm suspensions, and multi-link suspensions are also used, but are somewhat less common. Each suspension has it own advantages and disadvantages, making it more or less desirable in a given application.

Some suspensions maintain zero tire camber during body roll and heave, thereby optimizing tire capabilities during acceleration and braking. Live-axle suspensions and DeDion suspensions both exhibit this behavior. An additional advantage of DeDion suspensions is that they have less unsprung mass, which is beneficial to tire performance over unsmooth level road surfaces. Live-axle suspensions, however, use fewer parts and are cheaper to produce. An equal-length double A-arm suspension also maintains zero tire camber during heave, but, unlike live-axle and DeDion suspensions, the tires camber in the wrong direction during body roll. Double A-arm suspensions are also relatively light weight as compared to live-axle suspensions.

Figure 5:
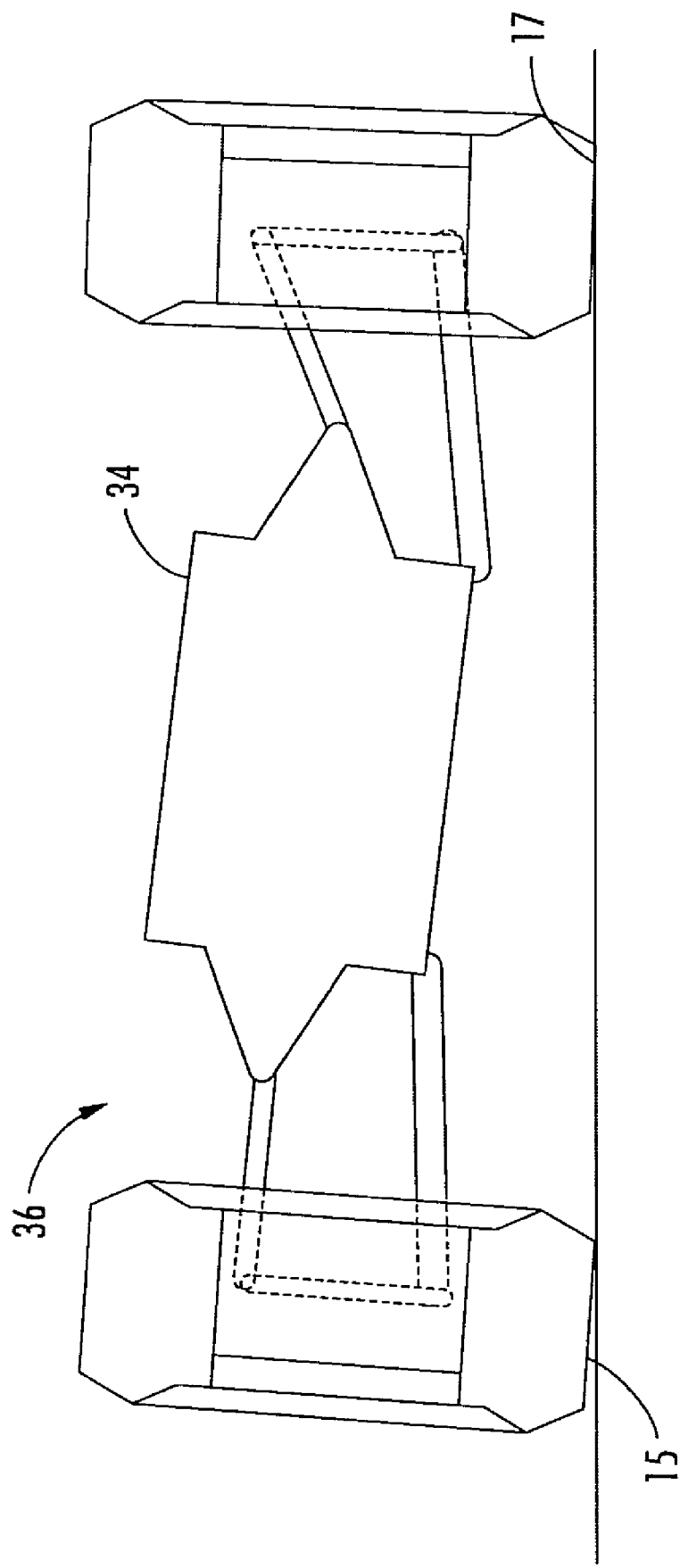
FIG. 5 is a schematic diagram illustrating the tire camber caused by body roll when a double A-arm suspension is used in a vehicle, the body roll undesirably exceeding the tire camber when both are in the same direction.

Thus, most vehicle suspension systems camber the tire(s) during body roll. It is possible to camber the tire(s) in the direction of the turn or corner using a double A-arm suspension, but this camber gain is typically less than that which would be optimal (i.e. less than the body roll). This is illustrated in FIG. 5, which shows the body 34 of the vehicle rolling to a greater degree than either of the tires 15 are cambering, although the two are linked by the double A-arm suspension 36. The disadvantage of the double A-arm suspension geometry is the excessive camber during heave, as previously shown in FIG. 4. The double A-arm either performs well during body roll or during heave, but typically does not perform both well during both. Thus, most double A-arm suspension geometries are compromised to perform less than optimally during both body roll and heave.

McPherson strut suspension systems typically camber the tire(s) in the wrong direction during body roll, and also camber the tire(s) during heave. However, McPherson struts allow for a variety of mounting configurations, allowing for more packaging options. McPherson strut suspension systems typically do not optimize tire performance, and are similar to the compromised double A-arm suspension systems in this respect. McPherson strut suspension systems rely on a strut, which is a translational joint, to resist the bending moment created by tire forces. The bending moment on this strut creates frictional forces which resist the motion of the suspension, resulting in decreased performance and poor ride quality. Design improvements have been proposed, but create additional packaging issues.

Multi-link suspensions are more complicated than the other typical suspensions, and still do not optimize tire camber during both body roll and heave. Multi-link suspensions offer benefits in terms of the various roll center and pitch center locations, and incorporate compliance or camber steer, if so desired.

In general, the vehicle suspension system of the present invention provides optimal camber gain in the direction of a turn or corner during body roll and provides substantially zero camber during heave. This vehicle suspension system weighs less than conventional live-axle suspensions, for example. The camber gain of the vehicle suspension system can also be changed by changing the associated mounting locations, without the need for additional parts.

Figure 6:
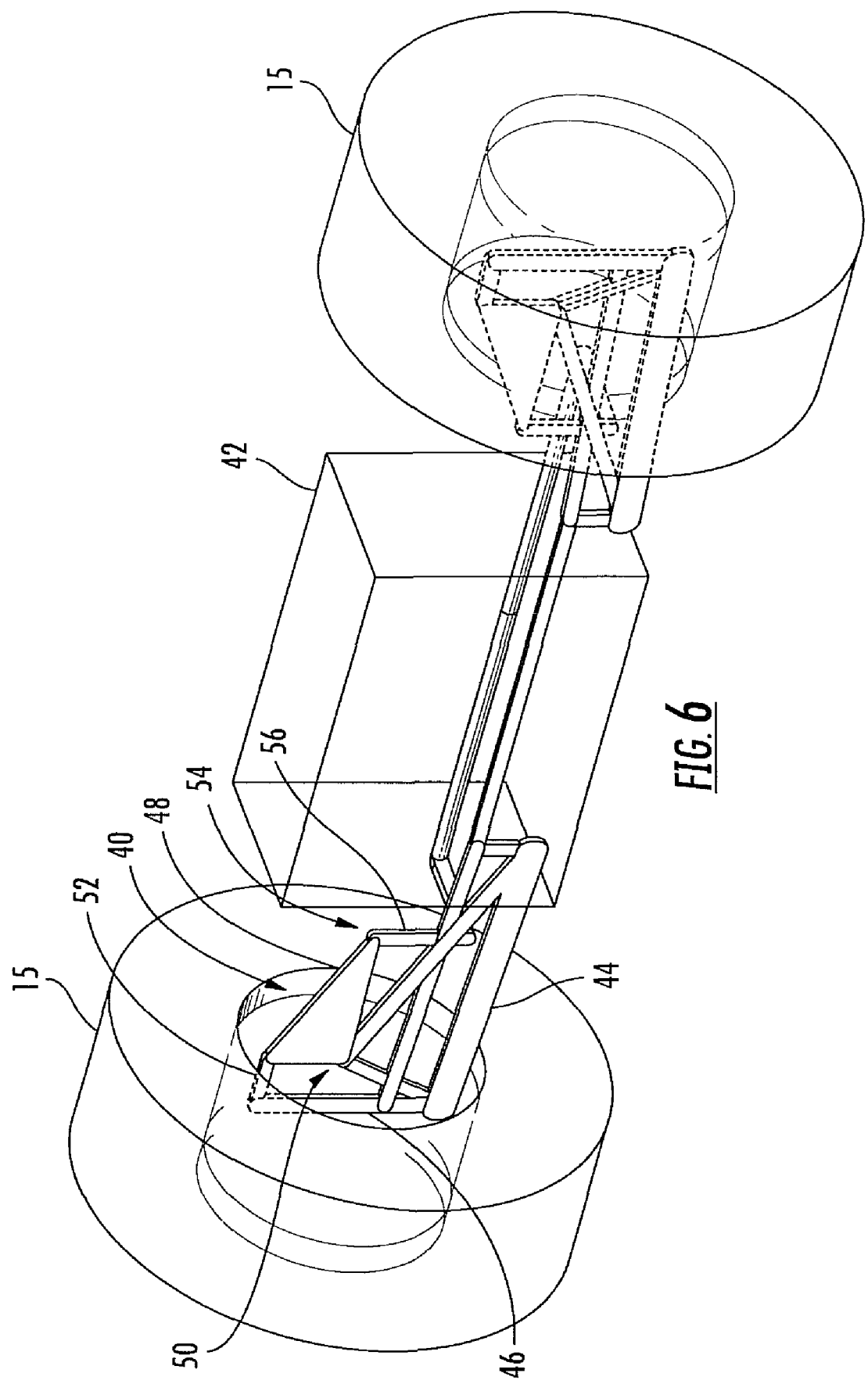
FIG. 6 is a semitransparent perspective view of one exemplary embodiment of the passive vehicle suspension system of the present invention.
Figure 7:
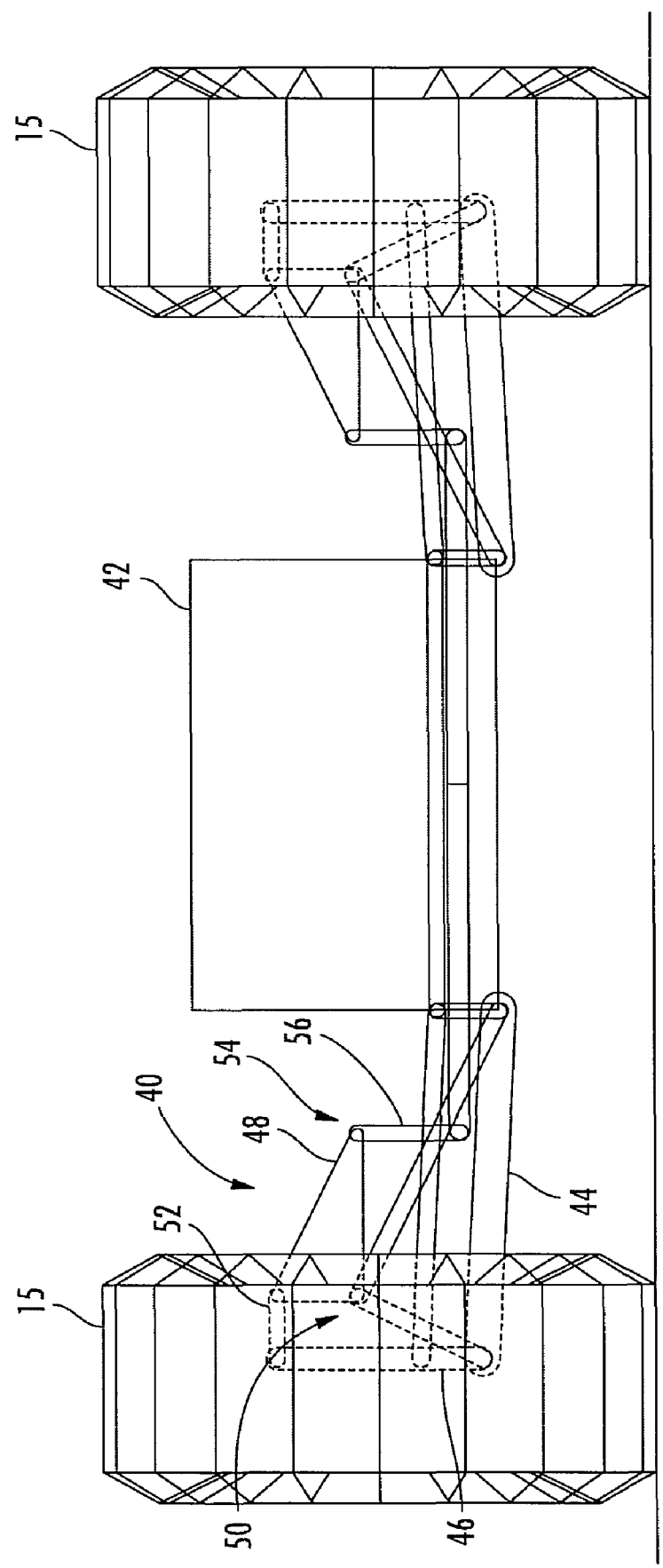
FIG. 7 is an isometric front view of the passive vehicle suspension system of FIG. 6.
Figure 8:
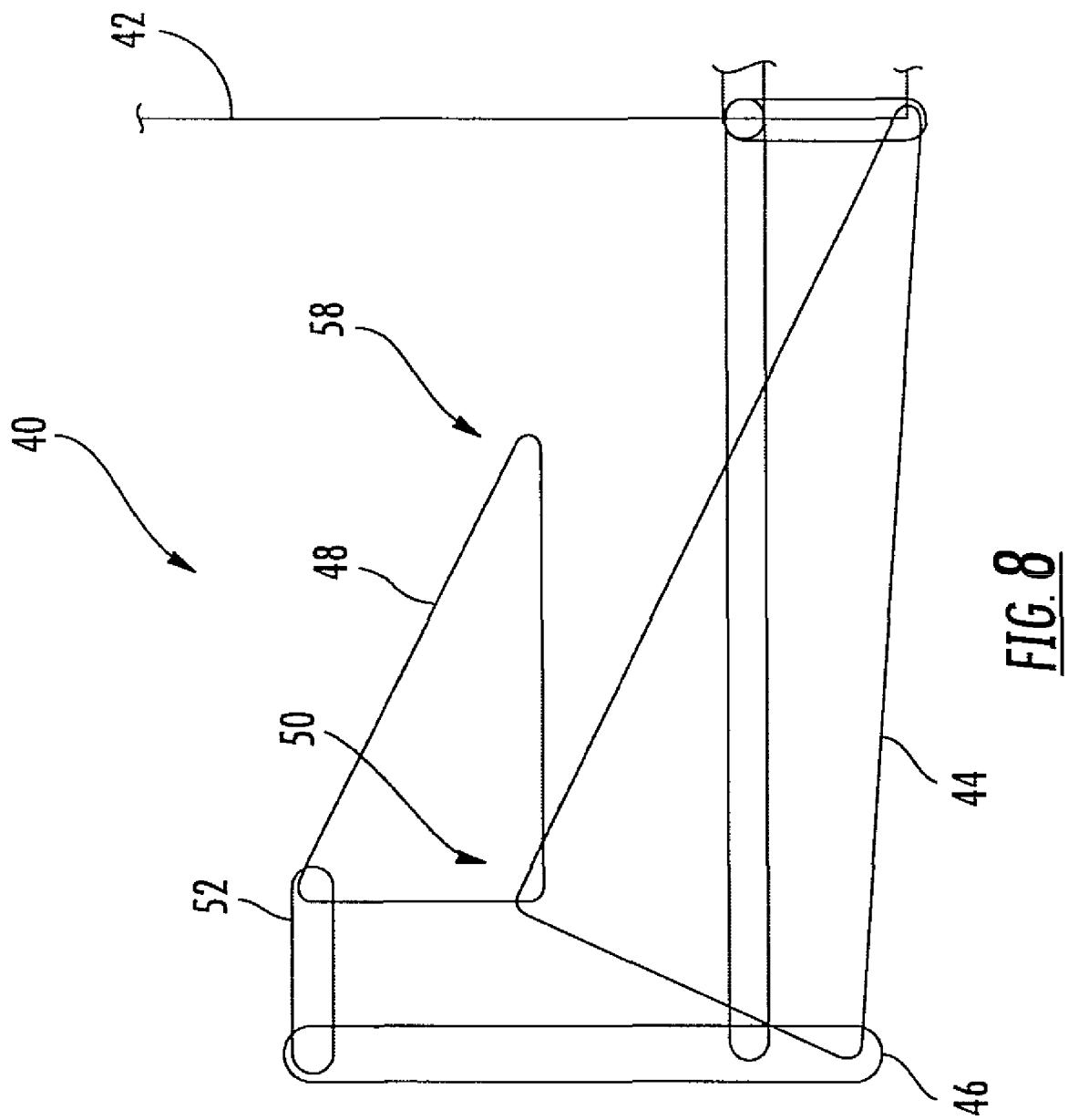
FIG. 8 is a partial isometric front view of the passive vehicle suspension system of FIGS. 6 and 7.

Referring to FIGS. 6-8, in one exemplary embodiment, the passive vehicle suspension system 40 of the present invention is shown in a half-car model. It will be readily apparent to those of ordinary skill in the art that this passive vehicle suspension system 40 can be implemented in either the front or the rear of a vehicle with drive axles, steering, brakes, etc. (none of which are shown for purposes of clarity). Preferably, the passive vehicle suspension system 40 is symmetrical from left to right. It is possible, however, to design an asymmetrical configuration for specific applications, and this possibility is contemplated by the present invention. Each individual part of the passive vehicle suspension system 40 is described in detail herein below in order to demonstrate how the passive vehicle suspension system 40 is assembled and works in operation. The sprung mass of the vehicle, or chassis 42, is represented conceptually by a box in the center of the vehicle. The left and right tires 15 (front or back) are also shown (FIGS. 6 and 7).

A lower control arm 44 connects an upright member 46 and a bell crank 48 to the chassis 42. Both the upright member 46 and the bell crank 48 can rotate relative to the lower control arm 44. Although the lower control arm 44 is represented conceptually as a substantially-triangular structure, it can have any suitable shape and can consist of multiple parts. Similarly, although the bell crank 48 is represented conceptually as a substantially-triangular structure, it can have any suitable shape and can consist of multiple parts. A spring (not shown) is also connected to the lower control arm 44 which produces a moment on the lower control arm 44 that supports the weight of the vehicle. In operation, the bell crank 48 changes the camber of the tire(s) 15 by rotating. The bell crank 48 is attached to the lower control arm 44 by a pivot joint 50 that allows one degree of freedom between the bell crank 48 and the lower control arm 44. The bell crank 48 also has an upright connecting link, referred to herein as the upright member-bell crank connector 52, which has one degree of freedom relative to the bell crank 48. A rotational joint 54 (FIGS. 6 and 7) with three degrees of freedom is used to attach the sway bar-bell crank connector link 56 (FIGS. 6 and 7) to the bell crank end 58 (FIG. 8).

Figure 9:
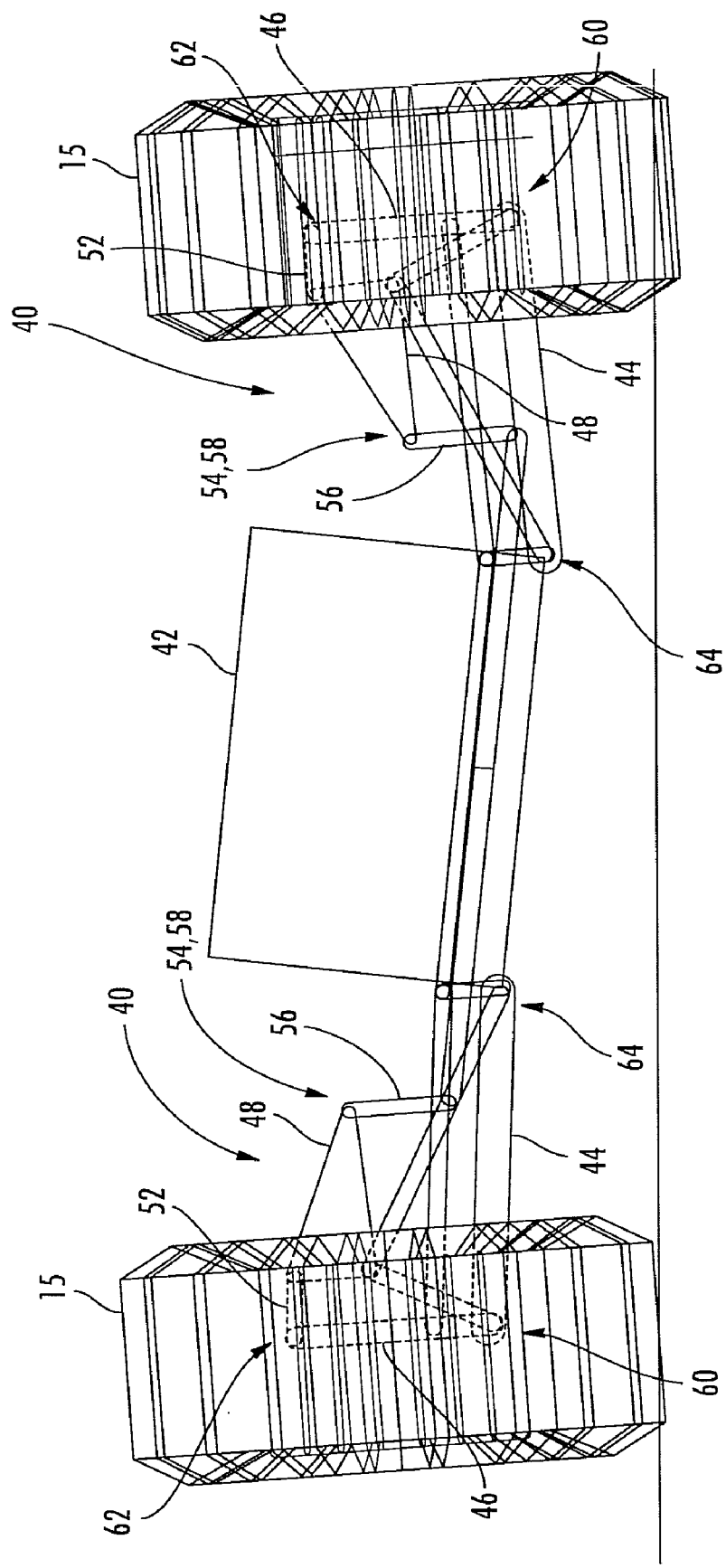
FIG. 9 is an isometric front view of the passive vehicle suspension system of FIGS. 6-8, the passive vehicle suspension system operating while the vehicle is in a turn or corner.

Referring to FIG. 9, the left bell crank end 58 is being pushed upwards by the left sway bar-bell crank connector link 56, causing the left tire 15 to lean into the turn or corner. Conversely, the right bell crank end 58 is being pushed downwards by the right sway bar-bell crank connector link 56, causing the right tire 15 to also lean into the turn or corner.

Ideally, the tire(s) 15 have one degree of freedom relative to the upright member 46, allowing rotation only about the spindles' axes. Each upright member 46 is connected to both the lower control arm 44 and the upright member-bell crank connector 52. The upright member 46 is typically coupled to a steering mechanism, etc., which is/are not shown because it/they are not necessary for understanding the operation of the passive vehicle suspension system 40. Pivot joints 60,62 connecting the upright member 46 to the lower control arm 44 and the upright member-bell crank connector 52, respectively, have only one degree of freedom in the model presented to simplify things and to, in operation, keep the tire(s) 15 steering straight ahead. The upright members 46 are also connected to an equal-camber mechanism 64, which is described in greater detail herein below.

Figure 10:
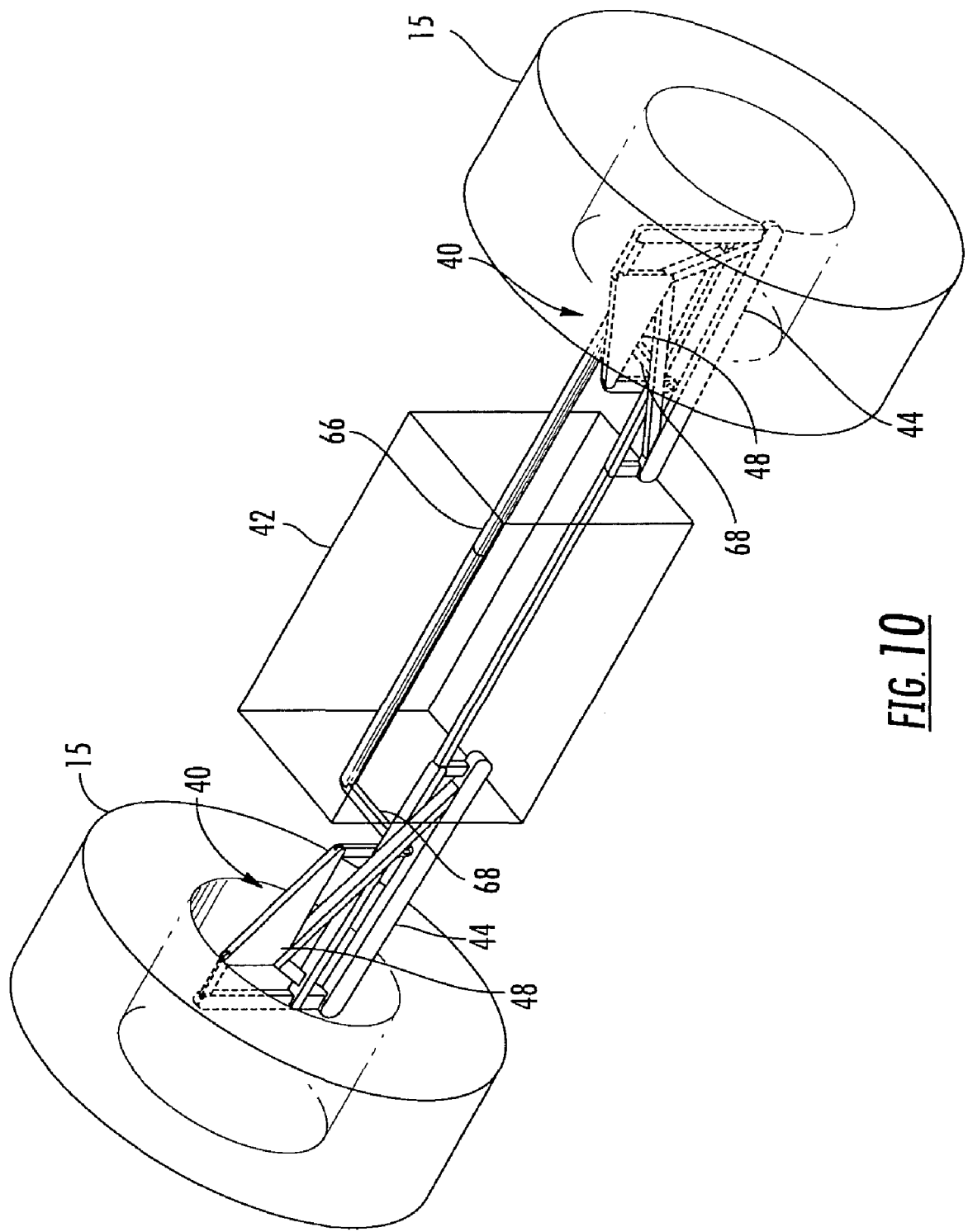
FIG. 10 is a semitransparent perspective view of the passive vehicle suspension system of FIGS. 6-9, highlighting the installation of a sway bar (anti-roll bar) that forms an important component of the passive vehicle suspension system.

Referring to FIG. 10, a sway bar (anti-roll bar) 66 is connected to the bell cranks 48 with perpendicular sway bar connectors 68. The sway bar 66 is a torsional spring, with lever arms located at each end of the sway bar 66. When a force is applied to one of the lever arms, the force is counteracted by an opposing force at the other lever arm. This opposing force, which creates a moment in the torsional spring, causes the torsional spring to twist. This rotation results in a deflection of the lever arms. The sway bar 66 can only rotate relative to the chassis 42 because it is attached to the chassis 42 with rotational joints (not illustrated). For understanding the operation of the passive vehicle suspension system 40, it is assumed that the sway bar 66 has a very large torsional stiffness, and, therefore, the deflection of the lever arms can be considered to be negligible. The sway bar 66, as designed and configured herein, does not "constrain" the suspension like a conventional sway bar does. Differences in left/right suspension travel are possible even with this rigid sway bar 66 because the bell cranks 48 can rotate. A conventional sway bar is typically connected to the lower control arms 44.

Figure 11:
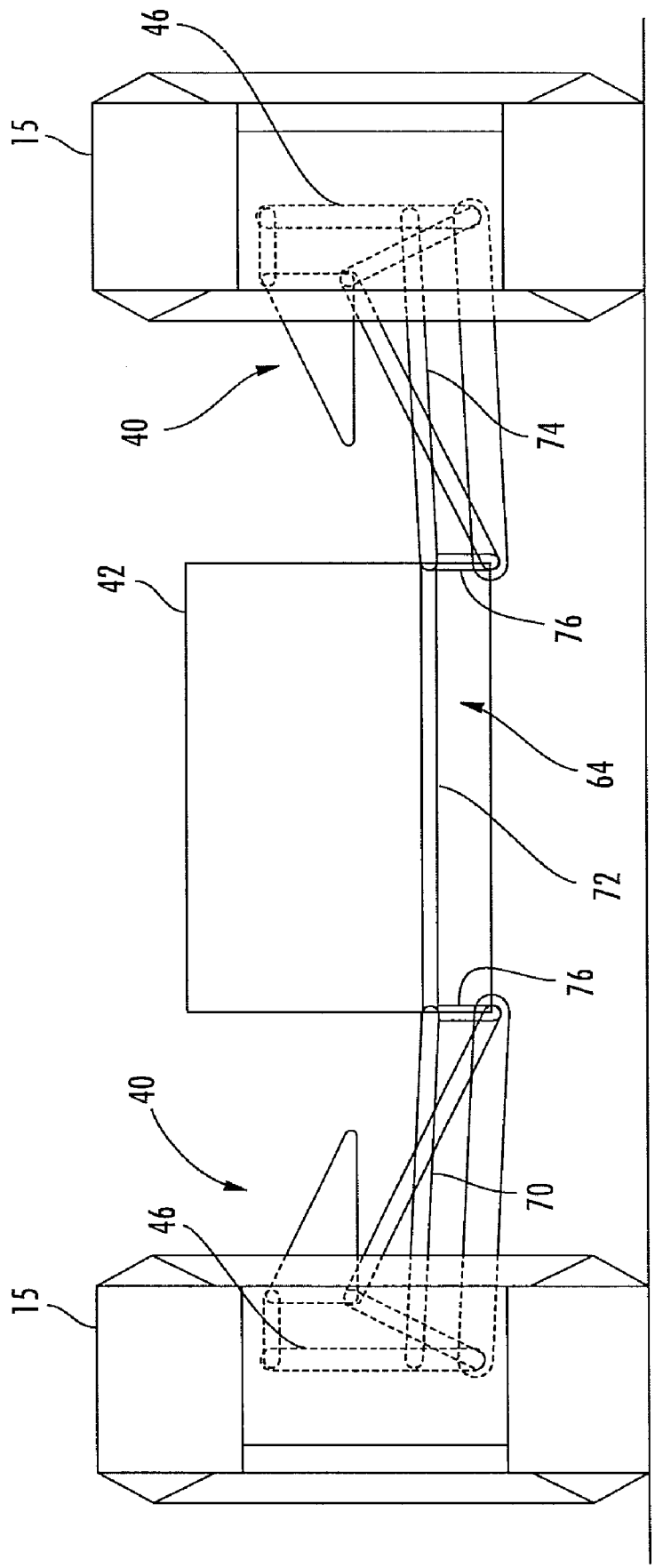
FIG. 11 is an isometric front view of the passive vehicle suspension system of FIGS. 6-10, highlighting the installation of an equal-camber mechanism that forms an important component of the passive vehicle suspension system.

Referring to FIG. 11, the equal-camber mechanism 64 is a series of four bar members which keep the left and right upright members 46 parallel. The four bar members include a left bar member 70, a center bar member 72, a right bar member 74, and two bar members which are parallel to the upright members 46, called equal-camber bar connectors 76. All of the bar members have rotational joints on their ends, allowing each of the bar members to rotate relative to one another. It is important to note that the center bar member 72 is not fixed to the chassis 42. The center bar member 72 is free to move left and right relative to the chassis 42, which allows the upright members 46 to rotate relative to the chassis 42.

Figure 12:
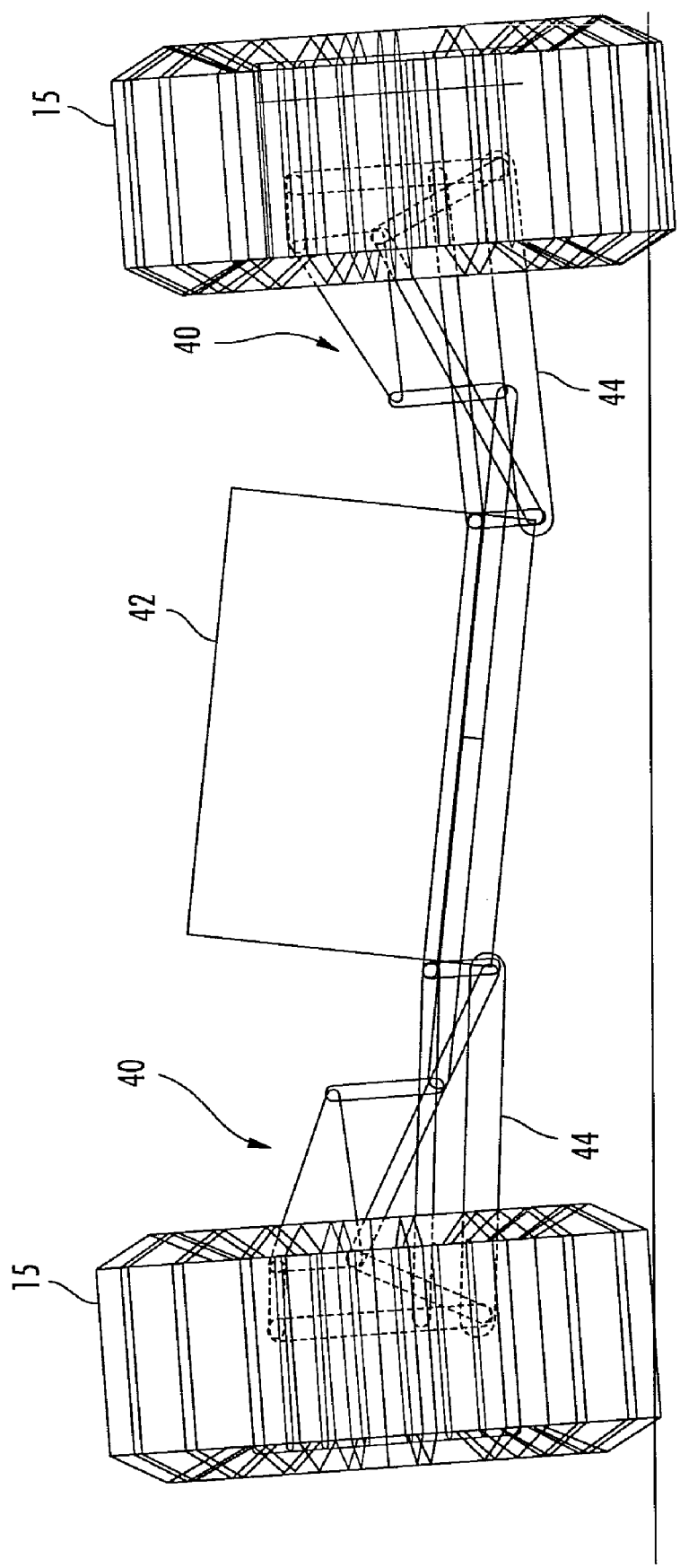
FIG. 12 is an isometric front view of the passive vehicle suspension system of FIGS. 6-11, the passive vehicle suspension system operating while the vehicle is in a turn or corner, highlighting the travel of the passive vehicle suspension system during body roll.

Referring to FIG. 12, when a vehicle begins to turn or corner, the lateral acceleration normally causes the chassis 42 to roll. If the vehicle is turning left, the chassis 42 rolls out of the turn or corner. In order for this to happen, the left suspension must travel a different amount than the right suspension. Typically, the right suspension compresses the spring (not illustrated) causing the right tire 15 to travel upwards into the wheel well (not illustrated). The left suspension travels downwards in a similar manner. FIG. 12 shows chassis roll viewed from behind with the vehicle turning left.

Suspension travel only occurs when the associated lower control arm 44 rotates relative to the chassis 42. The amount of rotation of the lower control arm 44 is a convenient way to describe suspension travel for this design and configuration. Notice the displacement of the right tire 15 into the road surface in FIG. 12, which represents the deflection of the right tire 15 due to the increased weight transfer during lateral acceleration.

Figure 13:
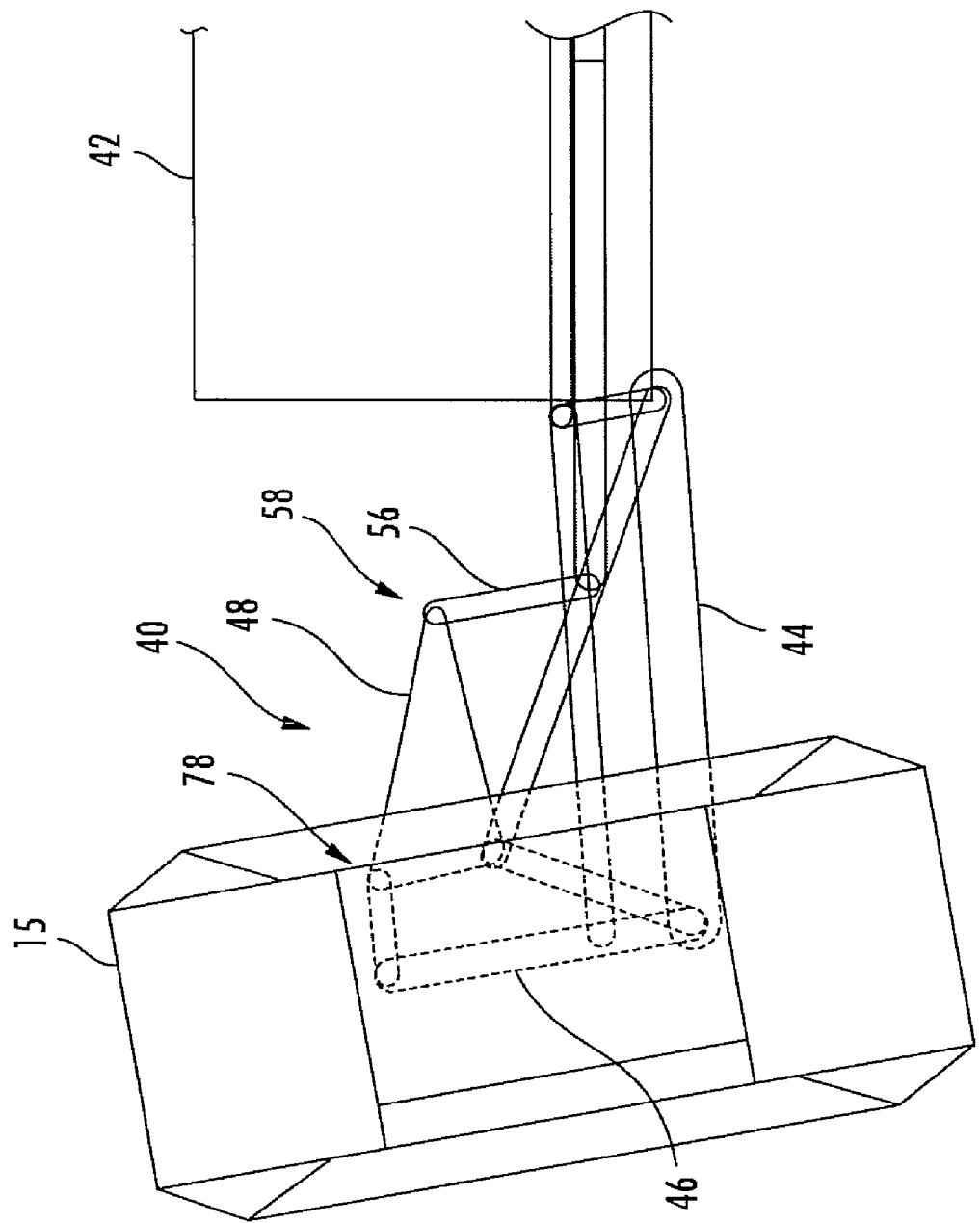
FIG. 13 is a partial isometric front view of the passive vehicle suspension system of FIGS. 6-12, the passive vehicle suspension system operating while the vehicle is in a turn or corner, highlighting the travel of the left side of the passive vehicle suspension system during body roll.

Referring to FIG. 13, viewing half of the passive vehicle suspension system 40 provides a clear understanding of how it works. The chassis 42 is held at a constant location and orientation so that movements relative to the chassis 42 are more easily identified. The left lower control arm 44 rotates counter-clockwise relative to the chassis 42. This results in the downward displacement of the left upright member 46, the left tire 15, and the left end 78 of the left bell crank 48. However, the right end 58 of the left bell crank 48 is unable to move downwards due to the left sway bar-bell crank connector link 56 causing the left bell crank 48 to rotate. This rotation of the left bell crank 48 results in the rotation of the left upright member 46, and therefore camber gain is achieved. The right passive vehicle suspension system (not illustrated) works in exactly the same manner, except that the displacements are in the opposite direction.

Figure 14:
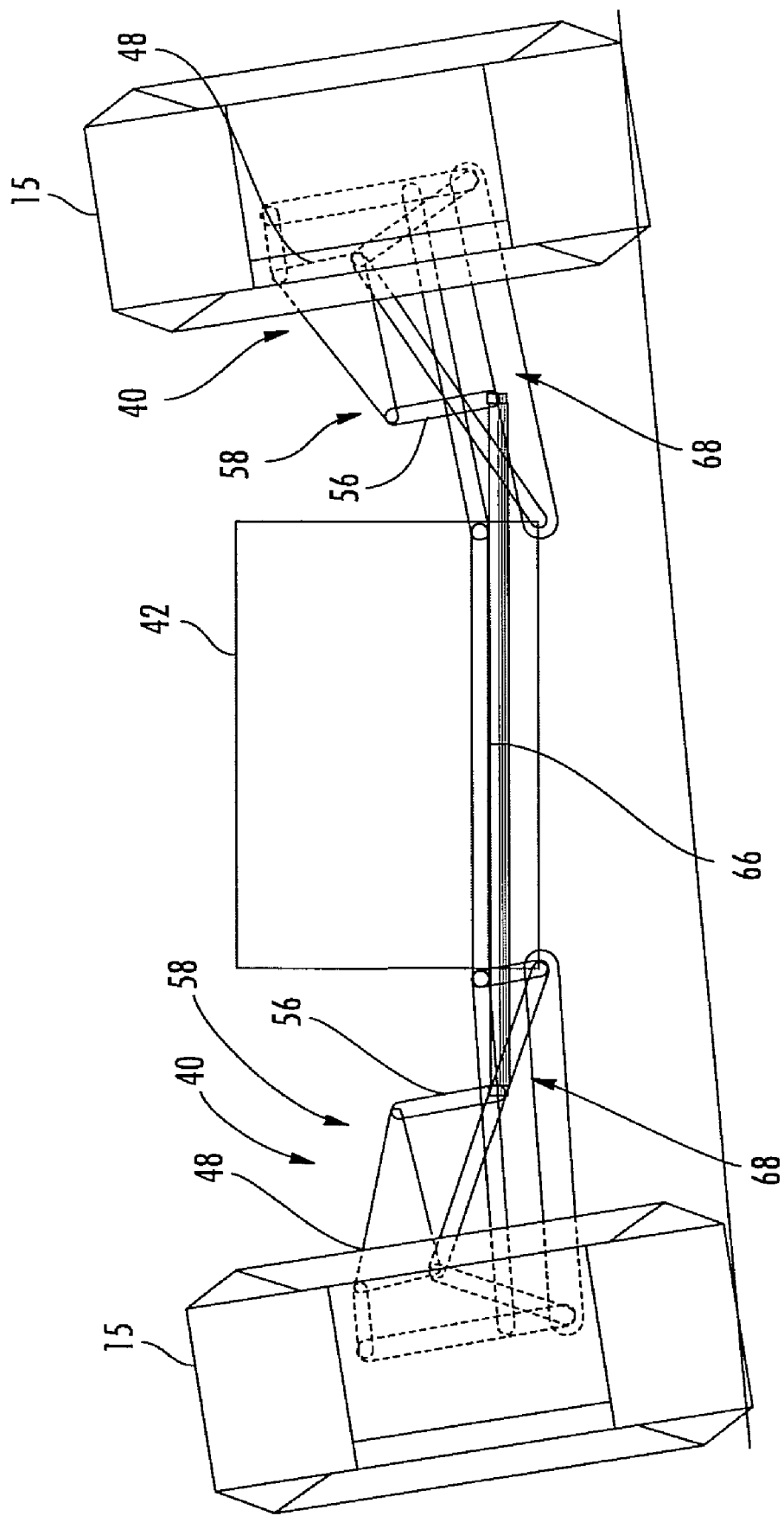
FIG. 14 is an isometric front view of the passive vehicle suspension system of FIGS. 6-13, the passive vehicle suspension system operating while the vehicle is in a turn or corner, shown with the body orientation fixed and the substantially-rigid sway bar in place.

Referring to FIG. 14, viewing the passive vehicle suspension system 40 as a whole, the ends 58 of the bell cranks 48 are attached to the sway bar-bell crank connector links 56. For this example, a constraint is placed on both of the bell crank ends 58 by the substantially-rigid sway bar 66 to be at the same height relative to the chassis 42. Although the height of the sway bar connectors 68 must be the same for an infinitely-rigid sway bar 66, the height can vary, especially during vehicle heave. The moment in the sway bar 66 is caused by the displacement differences in height between the left and right bell crank ends 58.

Figure 15:
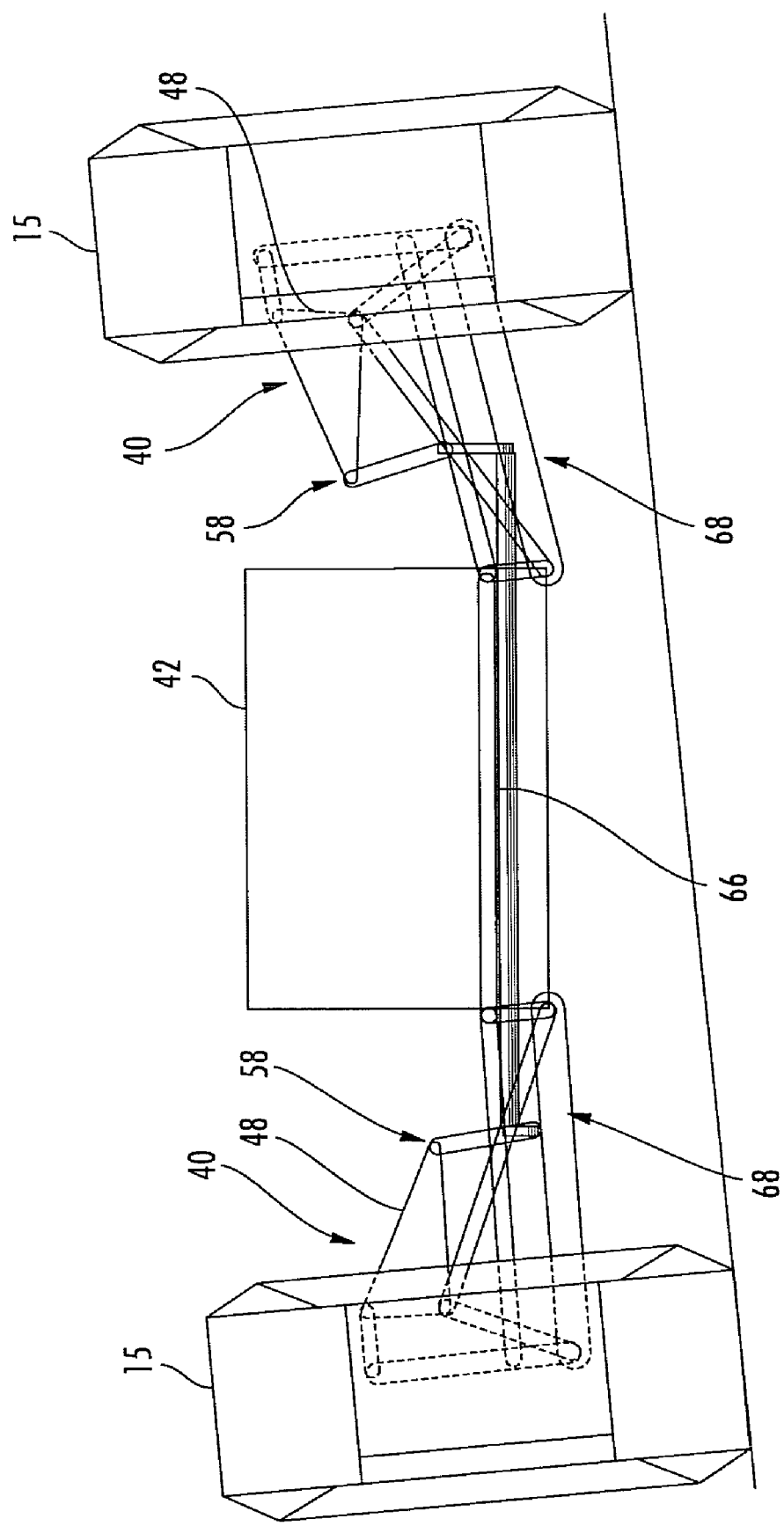
FIG. 15 is an isometric front view of the passive vehicle suspension system of FIGS. 6-14, the passive vehicle suspension system operating while the vehicle is in a turn or corner, showing the torsional displacement of a substantially-non-rigid sway bar and the corresponding relative displacement of the bell crank ends.

Referring to FIG. 15, if the sway bar 66 is allowed to twist, the left and right bell crank ends 58 will be at different heights relative to the chassis as 42. In general, less camber gain is possible with a substantially-non-rigid sway bar 66 due to greater allowed deflections of the left and right sway bar connectors 68, which results in height differences in the left and right bell crank ends 58 relative to the chassis 42. Because the right bell crank 48 is pulling upwards on the right sway bar connector 68 and the left bell crank 48 is pushing downwards on the left sway bar connector 68, the sway bar 66 deflects accordingly.

Figure 16:
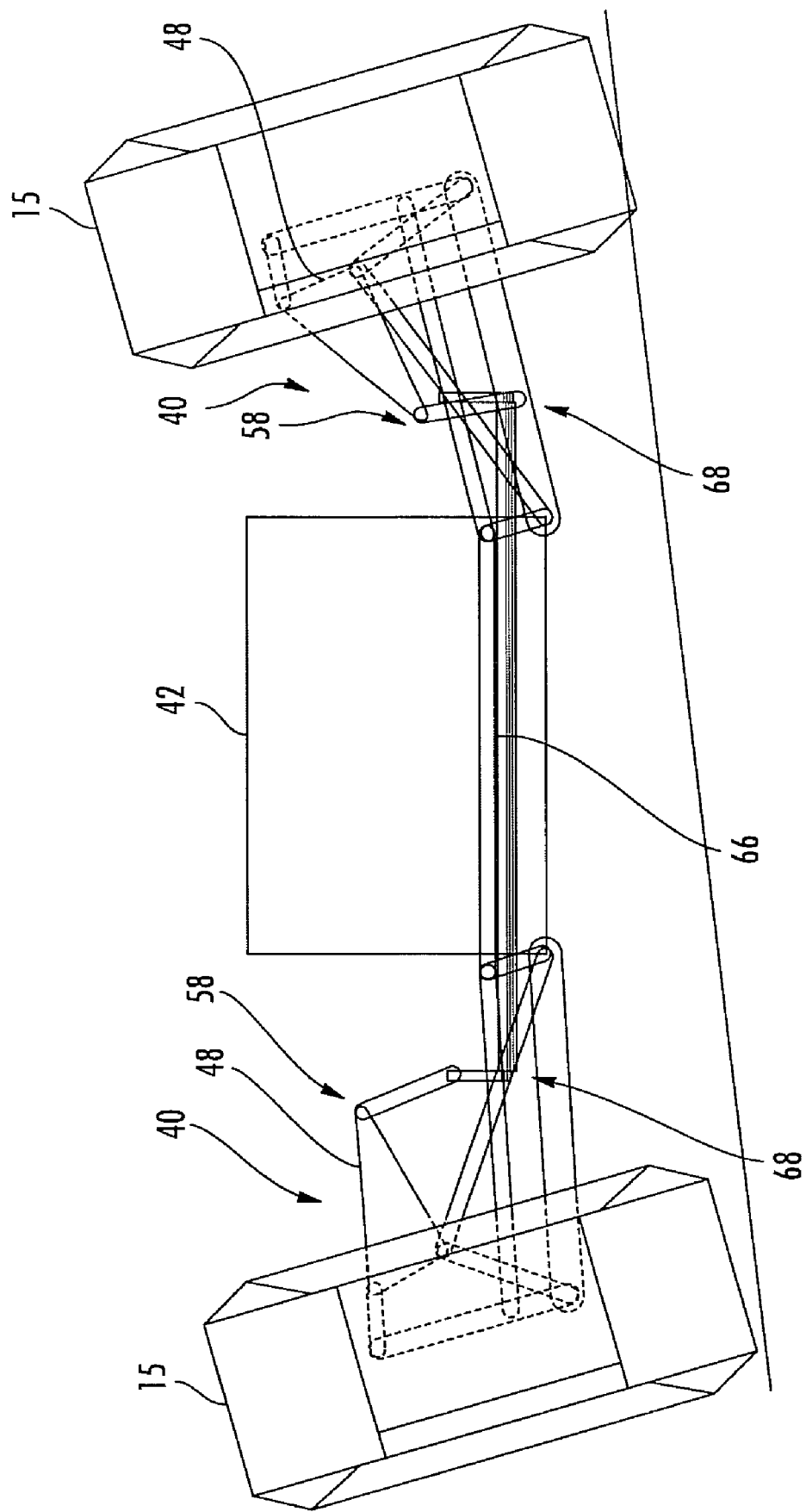
FIG. 16 is an isometric front view of the passive vehicle suspension system of FIGS. 6-15, the passive vehicle suspension system operating while the vehicle is in a turn or corner, showing the (theoretical) torsional displacement of a substantially-non-rigid sway bar and the corresponding relative displacement of the bell crank ends.

Referring to FIG. 16, if the sway bar 66 is allowed to twist in the opposite direction (which is not a likely scenario because the tire lateral forces are always pulling upwards on the right sway bar connector 68 while turning left), the bell cranks 48 would rotate the opposite direction. This would provide even more camber with respect to the road surface, but likely is not possible to achieve without the active controllers. It should be noted that camber gain is adjustable with bellcrank geometry.

Figure 17:
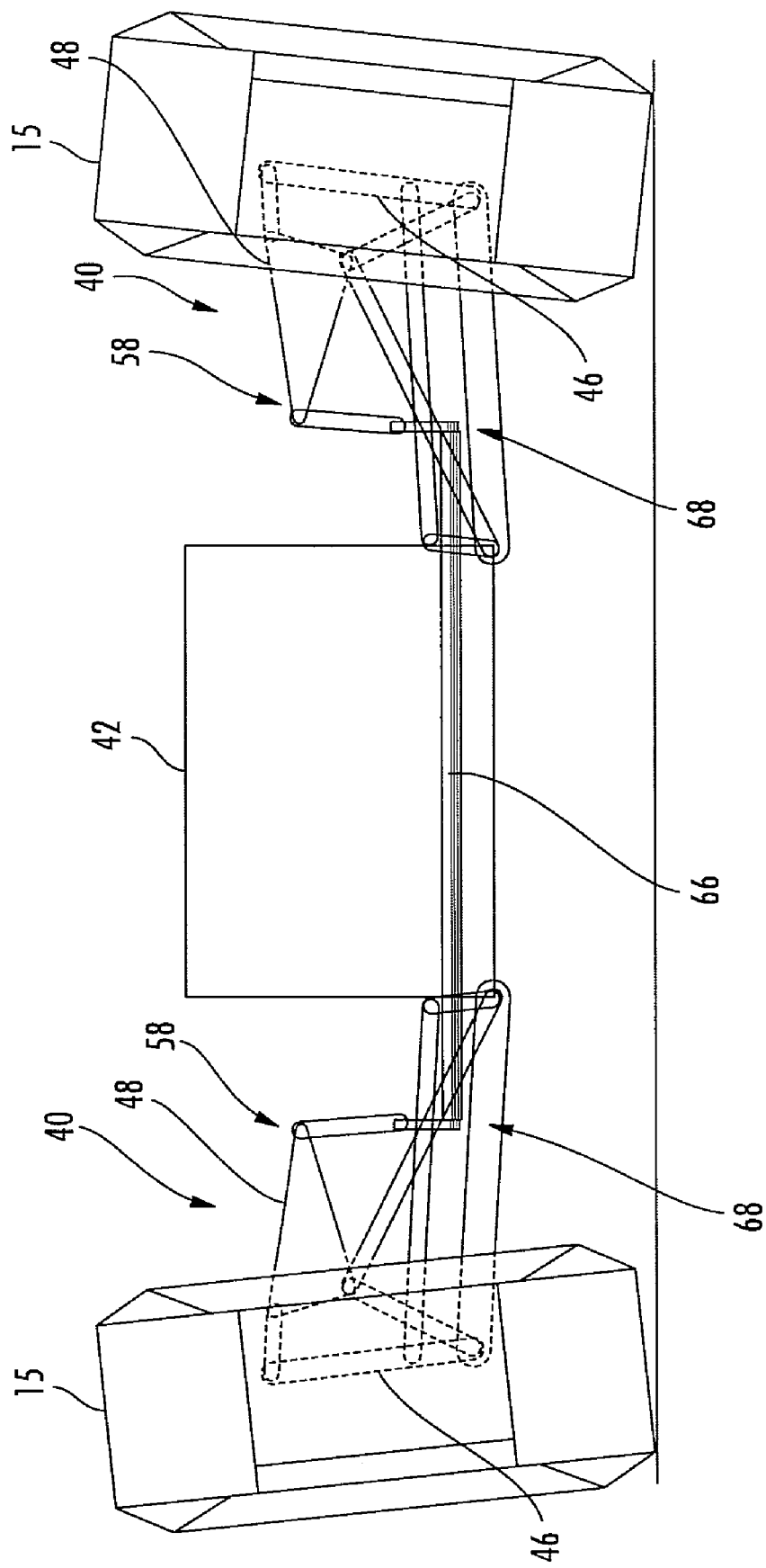
FIG. 17 is an isometric front view of the passive vehicle suspension system of FIGS. 6-16, highlighting the non-installation of the equal-camber mechanism that forms an important component of the passive vehicle suspension system.

Referring to FIG. 17, the removal of the equal-camber bar 64 (FIG. 11) removes a constraint on the upright members 46. Because the upright members 46 are no longer required to be parallel, both tires 15 can camber in and out together if the sway bar 66 rotates relative to the chassis 42. Assuming that the vehicle is traveling straight, with no lateral accelerations, it is possible to have positive or negative camber. If the sway bar connectors 68 rotate upwards, then both tires 15 have positive camber. This positive camber is due to the fact that both bell crank ends 58 move upwards, causing both upright members 46 to rotate equal amounts, but in opposite directions.

Figure 18:
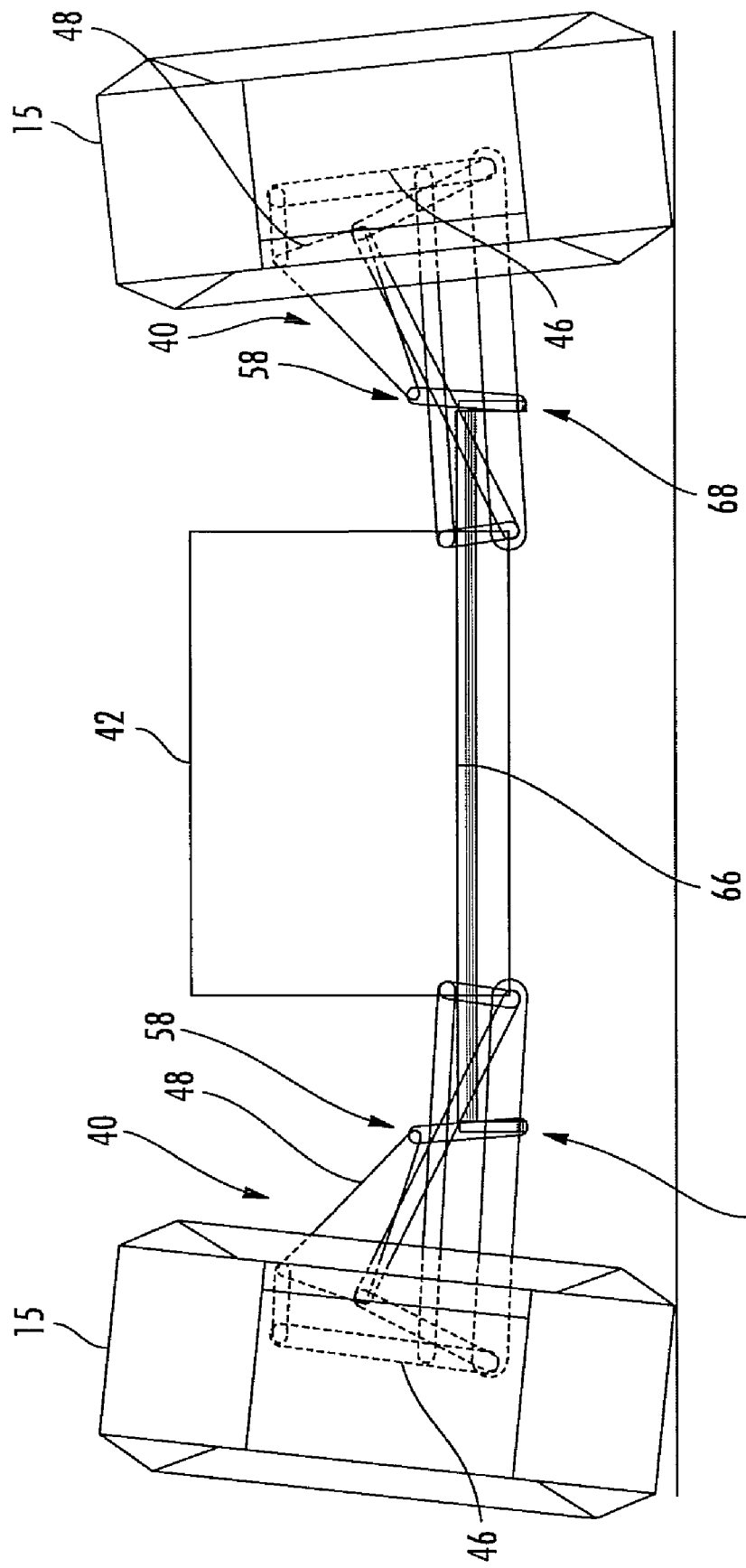
FIG. 18 is an isometric front view of the passive vehicle suspension system of FIGS. 6-17, also highlighting the non-installation of the equal-camber mechanism that forms an important component of the passive vehicle suspension system.

Referring to FIG. 18, if the sway bar connectors 68 twist downwards, then both tires 15 have negative camber. Toe-in and toe-out can cause these situations to occur, as well as road surface variations, if the equal-camber bar 64 (FIG. 11) is removed. FIGS. 17 and 18 illustrate the effects that the equal-camber bar 64 has on the height of the bell crank ends 58 with respect to the chassis 42.

Figure 19:
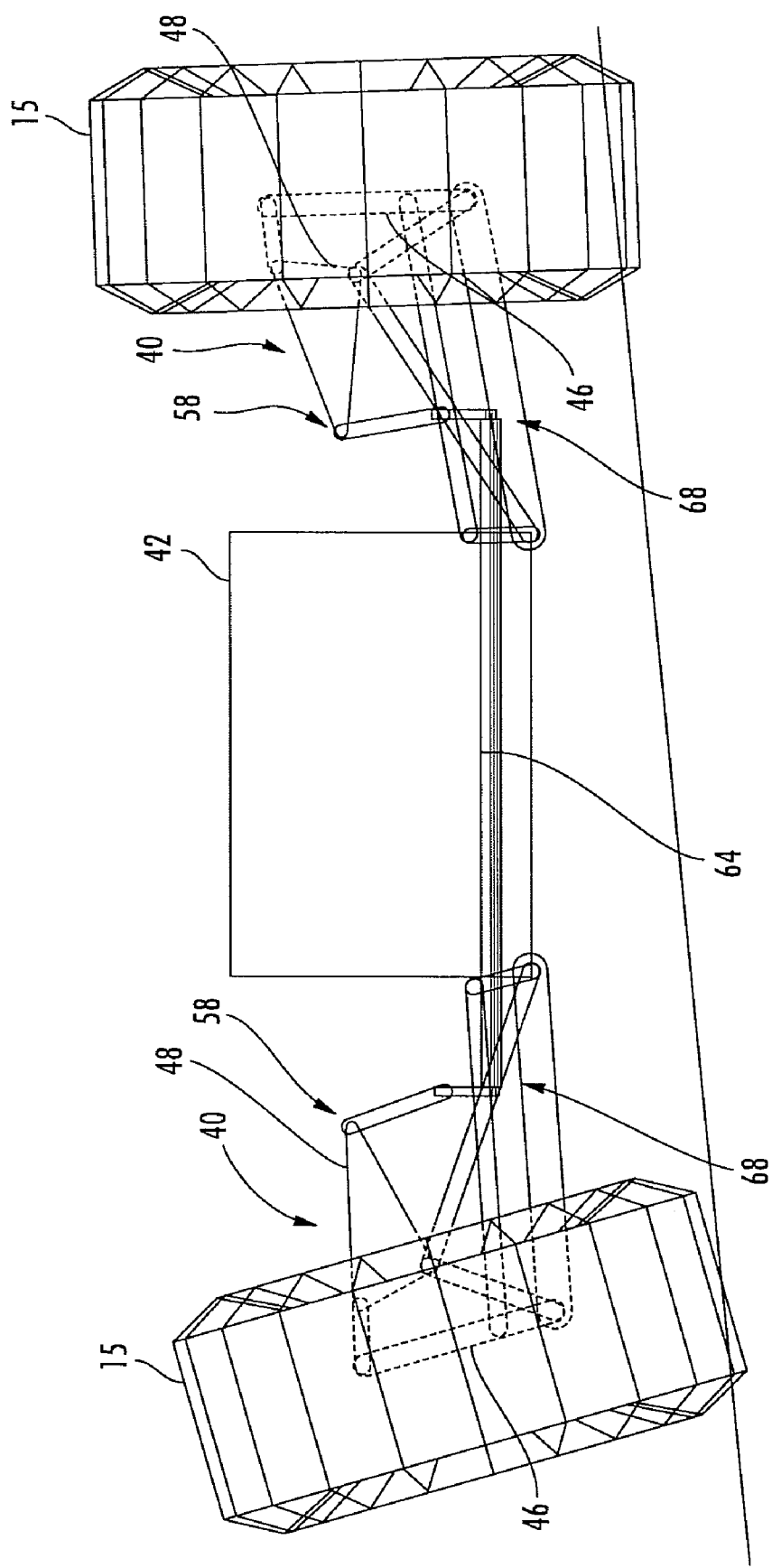
FIG. 19 is an isometric front view of the passive vehicle suspension system of FIGS. 6-18, further highlighting the non-installation of the equal-camber mechanism that forms an important component of the passive vehicle suspension system.

Referring to FIG. 19, during lateral acceleration, the removal of the equal-camber bar 66 results in an overall less stable system. Tire forces have a major influence on the reaction of the vehicle suspension system 40, as well as initial camber conditions before entering a turn or corner. Without the equal-camber bar 66, it is possible to have positive camber for both tires 15 during lateral acceleration. Positive camber is not desirable for the outside tire 15, for example, but is desirable for the inside tire 15 for maximum performance. By understanding what happens if the equal-camber bar 66 is absent, it is easier to predict when force arises in the equal-camber bar 66.

Figure 20:
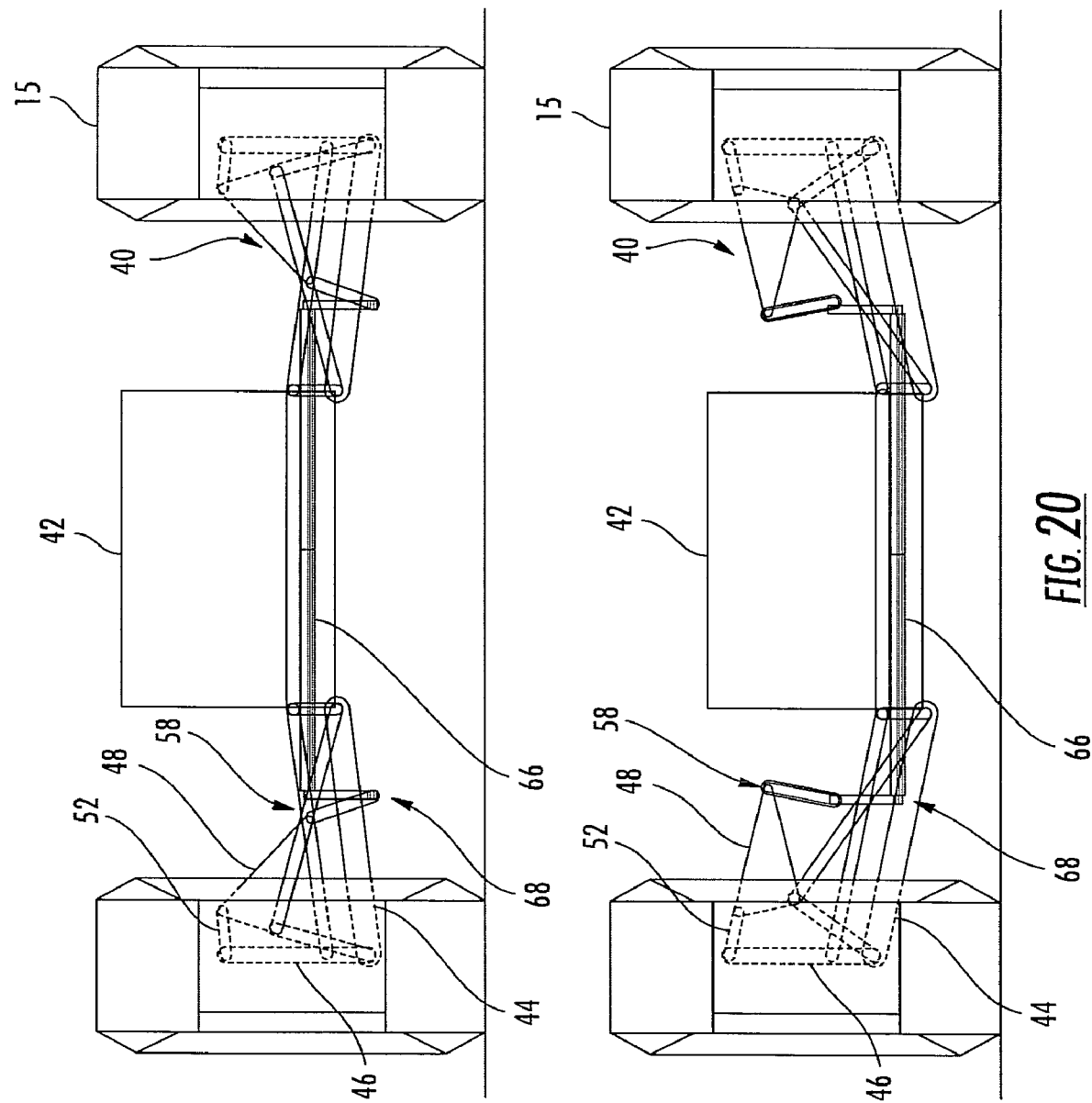
FIG. 20 is a series of isometric front views of the passive vehicle suspension system of FIGS. 6-19, the passive vehicle suspension system operating while the vehicle experiences heave conditions, highlighting the rotation of the bell cranks and sway bar such that zero camber is achieved.

Referring to FIG. 20, vertical chassis displacement relative to the road surface is called "heave." Heave typically occurs when traveling over a speed bump, cresting a hill, etc. Unlike most vehicle suspension systems, the design and configuration of the present invention allows for the tires 15 to maintain zero camber change during heave. Track-width changes do occur with heave; however, they can be minimized by utilizing a long, horizontal lower control arm 44. Notice the rotation of the bell crank 48 during heave. The upright member 46, lower control arm 44, bell crank 48, and upright member-bell crank connector 52 create a four-bar mechanism. As the lower control arm 44 rotates closer to the upright member 46, this moves the bell crank 48 closer to the upright member 46, resulting in bell crank rotation. A smaller bell crank vertical length would exaggerate this rotation, which can be desirable in certain applications.

An important consideration for this design and configuration is the direction that the chassis 42 rolls during lateral acceleration. Normally, vehicle suspension systems roll out of the turn or corner, but it is possible, under extreme conditions, for the chassis 42 to roll into the turn or corner. As long as the roll-center height of the vehicle is located below the center of gravity of the chassis 42, the vehicle will roll out of the turn or corner. However, if the roll-center height of the vehicle is located above the center of gravity of the chassis 42, the vehicle will roll into the turn or corner. If the chassis 42 rolls into the turn or corner, the tire camber will be in the wrong direction when using the vehicle suspension system 40 illustrated and described.

As the center of gravity height increases while the static roll-center remains at the same height, the roll moment will increase for a given lateral acceleration. The increased roll moment will result in more roll. As roll increases, the camber also increases in the preferred direction. Controlling the amount of chassis roll also controls the amount of camber during lateral acceleration. The particular geometry chosen greatly influences the camber per degree of roll.

It is a common misconception to believe there is more weight transfer to the outside tire 15 in a turn or corner if a vehicle rolls more. Steady-state weight transfer to the tires 15 is purely a function of center of gravity location and track width for a half-vehicle model. Roll can cause the center of gravity to move slightly, but generally the effect is negligible. Therefore stiffening springs or the sway bar 66 in a vehicle can decrease roll, but will not significantly affect the steady-state weight transfer of a symmetric half-vehicle model under steady-state conditions. Springs, sway bars, and dampers only affect the rate at which weight transfer occurs, not final steady-state weight transfer.

Figure 21:
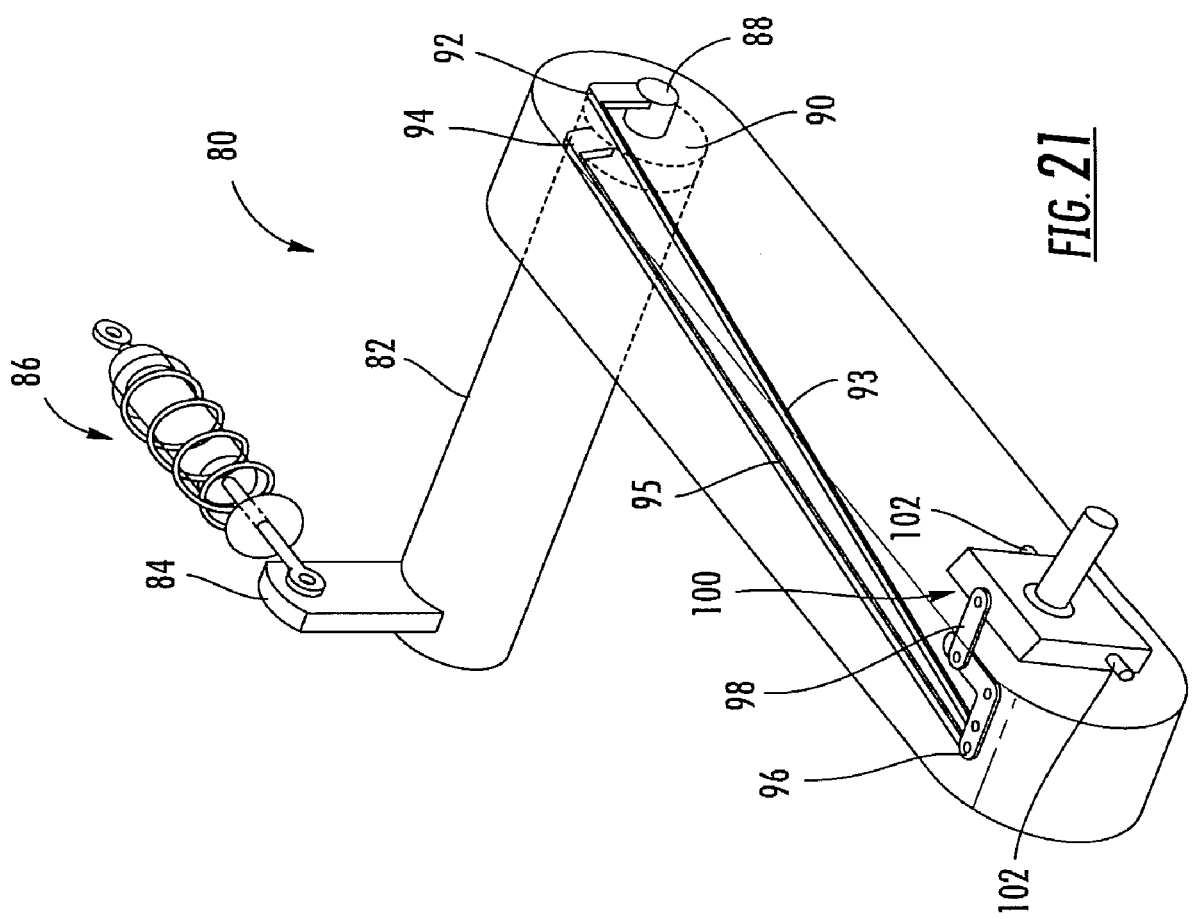
FIG. 21 is a semitransparent perspective view of an alternative exemplary embodiment of the passive vehicle suspension system of the present invention.
Figure 22:
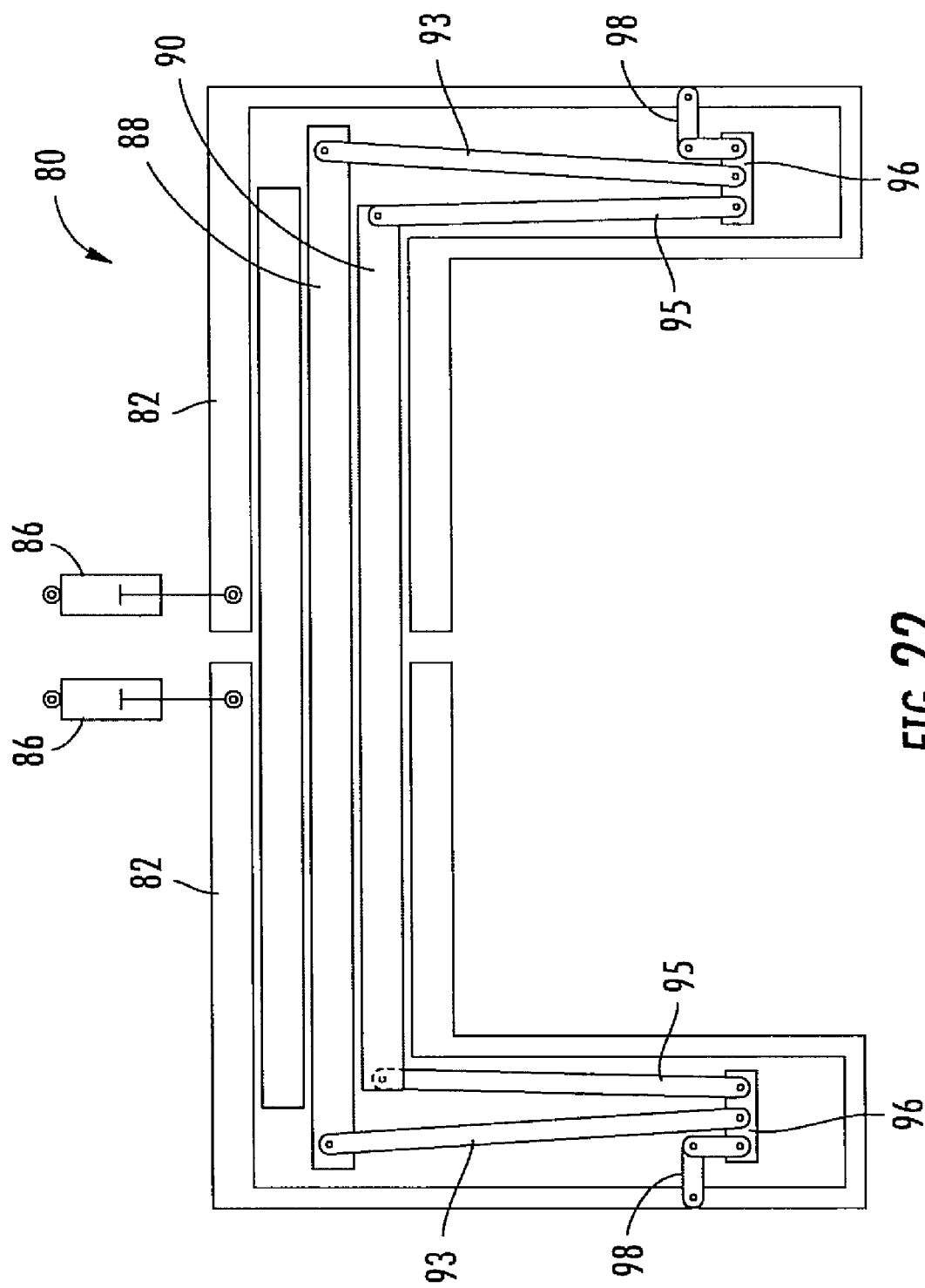
FIG. 22 is a top isometric view of the alternative exemplary embodiment of the passive vehicle suspension system of FIG. 21.
Figure 23:
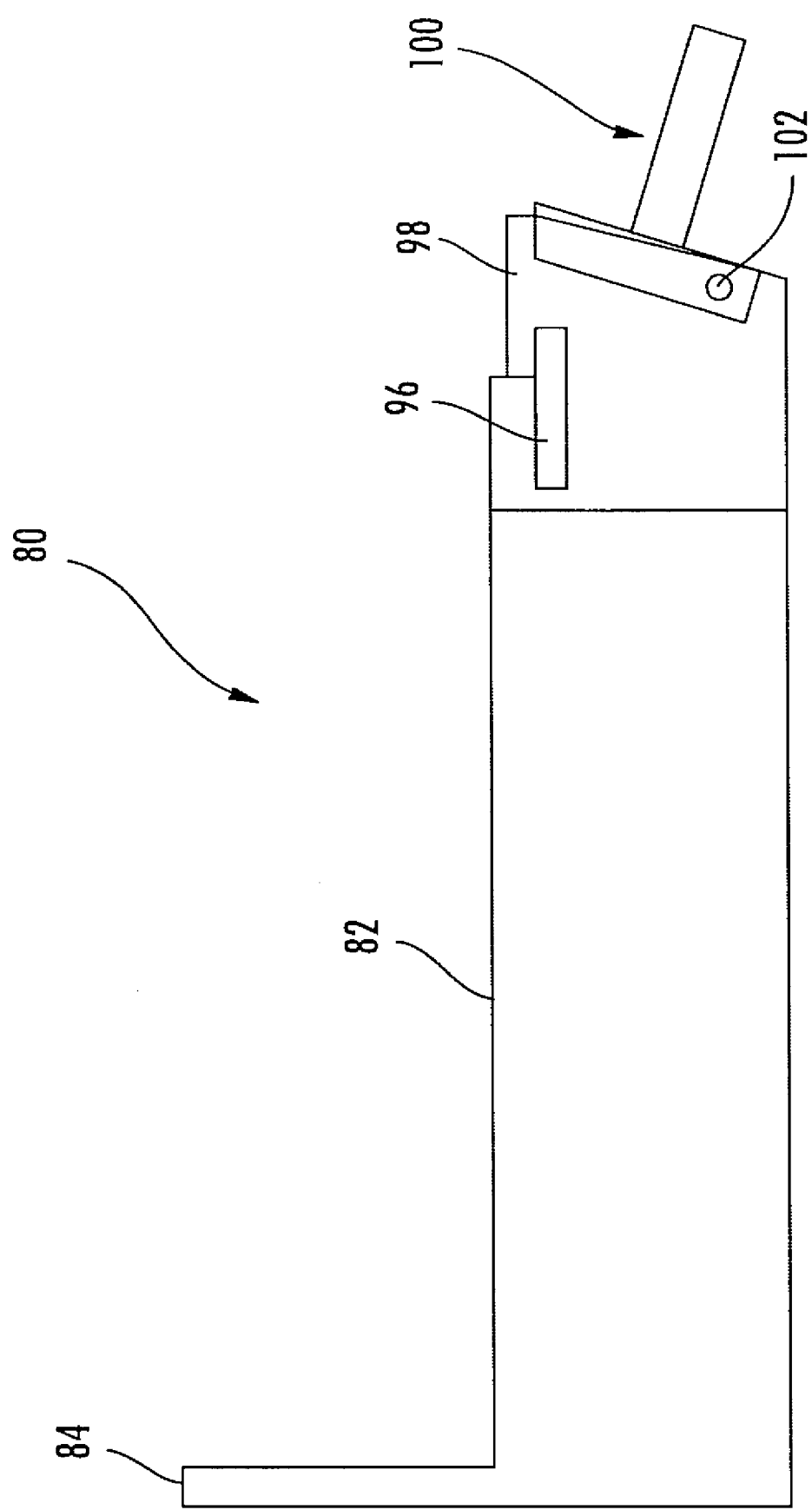
FIG. 23 is a front isometric view of the alternative exemplary embodiment of the passive vehicle suspension system of FIGS. 21 and 22.

Referring to FIGS. 21 and 22, in an alternative exemplary embodiment of the passive vehicle suspension system 80 of the present invention, an alternative mechanical configuration, or mechanical "package," that performs the functions and achieves the results described above includes a housing 82 including an attached or integrally-formed shock paddle 84 (FIG. 21) that is configured to pivotably engage a shock 86 or the like. This shock 86 is directly or indirectly coupled to the chassis of the vehicle. It should be noted that, at present, only one "side" of the passive vehicle suspension system 80 is being described. The other "side" of the passive vehicle suspension system 80 is substantially identical. A torsional splitter bar 88 and an equal camber bar 90 are disposed within the pair of housings 82 (as illustrated in FIG. 22). In the alternative exemplary embodiment illustrated, the torsional splitter bar 88 is disposed concentrically within the equal camber bar 90, both of which are disposed concentrically within the housing 82. Each of the torsional splitter bar 88 and the equal camber bar include an attached or integrally formed paddle 92 and 94 (FIG. 21), with both of the torsional splitter bar paddles 92 being disposed substantially on the "top" side of the torsional splitter bar 88, while one of the equal camber bar paddles 94 is disposed substantially on the "top" side of the equal camber bar 90 and the other of the equal camber bar paddles 94 is disposed substantially on the "bottom" side of the equal camber bar 90 (as illustrated in FIG. 22). The torsional splitter bar paddles 92 and the equal camber bar paddles 94 are each connected, via an elongate member 95 and 95, to and selectively bias a first linkage 96, which is, in turn, connected to and selectively biases a second linkage 98.

This second linkage 98 is operable for selectively cambering an axle assembly 100 (FIG. 21) that rotates about a pair of hinge pins 102 (FIG. 21).

FIG. 3 illustrates the passive vehicle suspension system 80 in a positive camber scenario.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following claims.

What is claimed is:

1. A passive vehicle suspension system, comprising:
a first system associated with a first tire of a vehicle, wherein the first system is configured to adjust the camber of the first tire relative to a chassis of the vehicle and a road surface in response to forces experienced by the vehicle, and wherein the first system comprises a member of fixed length and a plurality of connected members of variable collective length coupled to the first tire; and
wherein the passive vehicle suspension system operates without adding energy to the first system through an actuator.

2. The passive vehicle suspension system of claim 1, further comprising a second system associated with a second tire of the vehicle, wherein the second system is configured to adjust the camber of the second tire relative to the chassis of the vehicle and the road surface in response to forces experienced by the vehicle, and wherein the second system comprises a member of fixed length and a plurality of connected members of variable collective length coupled to the second tire.

3. The passive vehicle suspension system of claim 2, wherein the first system is coupled to the second system.

4. The passive vehicle suspension system of claim 2, wherein the first and second systems are configured to camber the first and second tires relative to the road surface into a turn or corner encountered by the vehicle, substantially opposite the direction of chassis roll.

5. The passive vehicle suspension system of claim 4, wherein the camber of the first and second tires relative to the road surface is substantially equal.

6. The passive vehicle suspension system of claim 2, wherein the first and second systems are configured to maintain a substantially-parallel relationship between the first tire and the second tire during chassis heave.

7. A passive vehicle suspension system, comprising:
a first upright member coupled to a first tire of a vehicle, wherein the first upright member cambers with the first tire relative to a chassis of the vehicle and a road surface;
a first lower control arm pivotably coupled to a chassis of the vehicle and the first upright member;
a first bell crank pivotably coupled to the first upright member and the first lower control arm;
a first connector link pivotably coupled between the first bell crank and the first upright member;
wherein the first upright member is disposed between the first tire and each of the first lower control arm and the first bell crank; and
wherein rotation of the first bell crank causes the first upright member and the first tire to camber relative to the chassis of the vehicle and the road surface.

8. The passive vehicle suspension of claim 7, further comprising:

a second upright member coupled to a second tire of the vehicle, wherein the second upright member cambers with the second tire relative to the chassis of the vehicle and the road surface;

a second lower control arm pivotably coupled to the chassis of the vehicle and the second upright member;

a second bell crank pivotably coupled to the second upright member and the second lower control arm;

a second connector link pivotably coupled between the second bell crank and the second upright member;

wherein the second upright member is disposed between the second tire and each of the second lower control arm and the second bell crank; and wherein rotation of the second bell crank causes the second upright member and the second tire to camber relative to the chassis of the vehicle and the road surface.

9. The passive vehicle suspension system of claim 8, further comprising a substantially-rigid sway bar rotatably coupled to the first and second bell cranks, wherein the substantially-rigid sway bar is rotatably coupled to the chassis of the vehicle.

10. The passive vehicle suspension system of claim 9, further comprising a sway bar connector coupled between the substantially-rigid sway bar and each of the first and second bell cranks.

11. The passive vehicle suspension system of claim 8, further comprising an equal-camber bar rotatably coupled to the first and second upright members.

12. A passive vehicle suspension system, comprising:

a first system associated with a first tire of a vehicle, wherein the first system is configured to adjust the camber of the first tire relative to a chassis of the vehicle and a road surface in response to forces experienced by the vehicle, and wherein the first system comprises a member of fixed length and a plurality of connected members of variable collective length coupled to the first tire;

a second system associated with a second tire of the vehicle, wherein the second system is configured to adjust the camber of the second tire relative to the chassis of the vehicle and the road surface in response to forces experienced by the vehicle, and wherein the second system comprises a member of fixed length and a plurality of connected members of variable collective length coupled to the second tire; and wherein the passive vehicle suspension system operates without adding energy to the first system through an actuator.

13. The passive vehicle suspension system of claim 12, wherein the first system is coupled to the second system.

14. The passive vehicle suspension system of claim 12, wherein the first and second systems are configured to camber the first and second tires relative to the road surface into a turn or corner encountered by the vehicle, substantially opposite the direction of chassis roll.

15. The passive vehicle suspension system of claim 14, wherein the camber of the first and second tires relative to the road surface is substantially equal.

16. The passive vehicle suspension system of claim 12, wherein the first and second systems are configured to maintain a substantially-parallel relationship between the first tire and the second tire during chassis heave.

17. The passive vehicle suspension system of claim 12, wherein the first system comprises:

a first upright member coupled to the first tire of the vehicle, wherein the first upright member cambers with the first tire relative to a chassis of the vehicle and the road surface;

a first lower control arm pivotably coupled to a chassis of the vehicle and the first upright member;

a first bell crank pivotably coupled to the first upright member and the first lower control arm;

a first connector link pivotably coupled between the first bell crank and the first upright member;

wherein the first upright member is disposed between the first tire and each of the first lower control arm and the first bell crank; and wherein rotation of the first bell crank causes the first upright member and the first tire to camber relative to the chassis of the vehicle and the road surface.

18. The passive vehicle suspension of claim 17, wherein the second system comprises:

a second upright member coupled to the second tire of the vehicle, wherein the second upright member cambers with the second tire relative to the chassis of the vehicle and the road surface;

a second lower control arm pivotably coupled to the chassis of the vehicle and the second upright member;

a second bell crank pivotably coupled to the second upright member and the second lower control arm;

a second connector link pivotably coupled between the second bell crank and the second upright member;

wherein the second upright member is disposed between the second tire and each of the second lower control arm and the second bell crank; and wherein rotation of the second bell crank causes the second upright member and the second tire to camber relative to the chassis of the vehicle and the road surface.

19. The passive vehicle suspension system of claim 18, further comprising a substantially-rigid sway bar rotatably coupled to the first and second bell cranks, wherein the substantially-rigid sway bar is rotatably coupled to the chassis of the vehicle.

20. The passive vehicle suspension system of claim 19, further comprising a sway bar connector coupled between the substantially-rigid sway bar and each of the first and second bell cranks.

21. The passive vehicle suspension system of claim 18, further comprising an equal-camber bar rotatably coupled to the first and second upright members.

* * * * *